United States Patent
Long et al.

(10) Patent No.: US 12,525,348 B2
(45) Date of Patent: Jan. 13, 2026

(54) CLOUD-EDGE COLLABORATIVE PROCESSING SYSTEM AND METHOD FOR ICU DATA BASED ON THIRD-PARTY BUSINESS

(71) Applicant: Shanghai SVM Medical Technology Co., Ltd., Shanghai (CN)

(72) Inventors: Yun Long, Shanghai (CN); Xiaobo Huang, Shanghai (CN); Longxiang Su, Shanghai (CN); Chun Pan, Shanghai (CN); Yingchuan Li, Shanghai (CN); Jicheng Zhang, Shanghai (CN); Yundai Chen, Shanghai (CN); Weiming Liu, Shanghai (CN); You Shang, Shanghai (CN); Hongli He, Shanghai (CN); Qixing Wang, Shanghai (CN); Zhenguo Zeng, Shanghai (CN); Xiantao Li, Shanghai (CN); Yunping Lan, Shanghai (CN); Long Xu, Shanghai (CN); Baoshi Han, Shanghai (CN); Xue Bai, Shanghai (CN); Xianlong Liu, Shanghai (CN); Bin Zhu, Shanghai (CN); Zujun Tang, Shanghai (CN); Haoyu Yang, Shanghai (CN); Jinjing Zhang, Shanghai (CN)

(73) Assignee: Shanghai SVM Medical Technology Co., Ltd., Shanghai (CN)

( * ) Notice: Subject to any disclaimer, the term of this patent is extended or adjusted under 35 U.S.C. 154(b) by 325 days.

(21) Appl. No.: 18/450,352

(22) Filed: Aug. 15, 2023

(65) Prior Publication Data

US 2023/0395253 A1    Dec. 7, 2023

Related U.S. Application Data

(63) Continuation-in-part of application No. 17/052,582, filed as application No. PCT/CN2019/087110 on May 15, 2019, now Pat. No. 11,769,586.

(30) Foreign Application Priority Data

May 16, 2018   (CN) .......................... 201810469182.5

(51) Int. Cl.
*G16H 40/67*    (2018.01)
*G06F 21/62*    (2013.01)
(Continued)

(52) U.S. Cl.
CPC ......... *G16H 40/67* (2018.01); *G06F 21/6245* (2013.01); *G16H 10/60* (2018.01);
(Continued)

(58) Field of Classification Search
CPC ........ G16H 40/67; G16H 10/60; G16H 15/00; G16H 40/20; G16H 50/20; G16H 80/00; G16H 50/30; G06F 21/6245
See application file for complete search history.

(56) References Cited

U.S. PATENT DOCUMENTS

| | | | |
|---|---|---|---|
| 2016/0378943 A1* | 12/2016 | Vallée | G16H 40/63 705/2 |
| 2018/0032691 A1* | 2/2018 | Zur | A61B 5/259 |
| 2018/0256111 A1* | 9/2018 | Ganapathy | G16H 50/30 |

* cited by examiner

Primary Examiner — Austin J Moreau
(74) Attorney, Agent, or Firm — Syncoda LLC; Feng Ma

(57) ABSTRACT

A cloud-edge collaborative processing system includes: an edge computing system, an ICU diagnosis and treatment device, a service terminal device, and a cloud platform. The edge computing system collects multi-source heterogeneous medical data output from the ICU diagnosis and treatment devices and performs preprocessing, stores preprocessed data into an edge database, and connects to the cloud platform for data transmission and business interaction. The cloud platform connects to a plurality of edge computing systems to perform computation and processing of massive data. The medical-staff handheld terminals and the data terminals of wards are used to issue service instructions to the cloud platform to obtain the required third-party-business services.

18 Claims, 14 Drawing Sheets

(51) Int. Cl.
*G16H 10/60* (2018.01)
*G16H 15/00* (2018.01)
*G16H 40/20* (2018.01)
*G16H 50/20* (2018.01)
*G16H 80/00* (2018.01)

(52) U.S. Cl.
CPC .............. *G16H 15/00* (2018.01); *G16H 40/20* (2018.01); *G16H 50/20* (2018.01); *G16H 80/00* (2018.01)

CLOUD-EDGE COLLABORATIVE PROCESSING SYSTEM AND METHOD FOR ICU DATA BASED ON THIRD-PARTY BUSINESS

CROSS-REFERENCE TO RELATED APPLICATIONS

This is a continuation-in-part of U.S. application Ser. No. 17/052,582 filed on Nov. 3, 2020, which is a national stage of International Patent Application No. PCT/CN2019/087110 filed on May 15, 2019, which claims priority to Chinese Patent Application No. 201810469182.5 filed on May 16, 2018. The disclosures of the above-referenced applications are hereby incorporated by reference in their entirety.

BACKGROUND

Diagnostic and treatment devices used in intensive care units (ICUs) of hospitals all over the world are of vital importance for saving patients' lives. Every day, tens of millions of different types of diagnostic and treatment devices are used in clinical applications in ICUs around the world, and the number of these devices is still rapidly growing.

With the rapid development of science and technology, the ICU diagnosis and treatment devices are becoming increasingly advanced, resulting in an expanding amount of data. Taking multi-parameter monitors and ventilators commonly used in ICUs as examples, each of these devices generates only tens of KB of data per day thirty years ago. Nowadays, each of these devices generates hundreds of MB of waveform data and numerical data per day, but the devices do not have the capability of long-term data storage or producing data analysis reports. False/invalid alarming rates of the devices are extremely high, which requires medical care personnel to spend a lot of time to observe and analyze data on the screen of the device. Medical data generated by ICUs of hospitals every day far exceeds what medical care personnel can handle. Computing power and capacity of computer centers in most hospitals cannot meet professional needs of ICU data processing. Another issue worthy of attention is the global shortage of ICU professionals in hospitals. In-service medical care personnel undertake complicated and onerous data processing tasks, which not only exhausts them, but also directly affects the quality of medical care.

For decades, commercial competition has led to different data communication protocols and formats among similar medical devices from different manufacturers. ICUs of hospitals often use similar devices from multiple manufacturers, but these manufacturers do not share their data communication protocols and formats with each other. This results in multi-source heterogeneous medical data in ICUs, making centralized processing quite difficult. Moreover, communication protocols of ICU diagnostic and treatment devices do not support the input of patient information. In ICUs of hospitals, the same diagnosis and treatment device (for the same hospital bed) often serves multiple patients, making it difficult to automatically identify different patients that are served by the same device. These issues have led to a "polarization" effect. While ICU diagnostic and treatment device technology continues to advance and produce an increasing amount of data, a clinical application mode for medical data is not progress. This is clearly not conducive to the development of global intensive care medicine.

SUMMARY

The present application relates to the technical field of medical cloud platforms, and in particular, to a cloud-edge collaborative processing system and method for ICU data based on third-party business.

In view of the above analysis, embodiments of the present application aim to provide a cloud-edge collaborative processing system and method for ICU data based on third-party business, to solve analysis and processing issues of massive ICU medical data in many hospitals.

According to an aspect, an embodiment of the present application provides a cloud-edge collaborative processing system for ICU data based on third-party business, including: an edge computing system, an ICU diagnosis and treatment device, a service terminal device, and a cloud platform, where the ICU diagnosis and treatment device includes a plurality of vital-sign monitoring devices and a plurality of life support devices, and is connected to the edge computing system; the edge computing system is configured to acquire multi-source heterogeneous medical data output from the ICU diagnosis and treatment device, preprocess the medical data through resolving, classification, and data-format standardization to generate medical data in a standard format, and store the medical data in an edge database; the edge computing system is connected to hospital internal information systems of users to perform data interaction and obtain user information, patient information, and clinical information; the service terminal device includes a plurality of medical-staff handheld terminals and a plurality of ward data terminals, and is connected to the cloud platform to perform data interaction; and the cloud platform is connected to the edge computing system and performs data interaction.

The beneficial effects of the above technical solution are as follows: The edge computing system performs centralized management on various ICU diagnostic and treatment devices, and standardized preprocessing is performed on a format of the multi-source heterogeneous medical data. This not only unifies a data format, reduces data complexity, but also effectively reduces an upstream data amount, shortens a network delay, reduces network bandwidth costs, and greatly improves a load capacity of the cloud platform, the computing efficiency and storage capacity of massive data. A service terminal device of a user directly interacts with cloud-platform data, effectively improving a response speed and flexibility, while reducing the pressure on the edge computing system.

Based on a further improvement on the foregoing system, the edge computing system includes an edge server, and the edge server includes a system management unit, a data preprocessing unit, a security management unit, and the edge database.

The system management unit is configured to manage the ICU diagnosis and treatment device accessed by the edge computing system and a running status of the edge computing system, report to the cloud platform; receive data and control instructions from the cloud platform; execute various business tasks including updating a program, a configuration file, and data in the edge database; maintain business collaboration between the cloud platform and the edge computing system; manage the accessed hospital internal information system; take over operation of a data service in the event if a network outage of the cloud platform-edge computing system, and after data communication of the network is restored, encrypt medical data during the failure event and upload encrypted medical data to the cloud platform for further processing.

The data preprocessing unit is configured to generate the medical data in the standard format through preprocessing on the multi-source heterogeneous medical data of the ICU diagnosis and treatment device, while keeping device-initial-alarming-event signs; bind ID codes of an ICU diagnosis and treatment device therein and patient information to generate service serial numbers; encapsulate integrally one of the service serial numbers and the preprocessed medical data and store encapsulated data into the edge database; synchronously encrypt and transmit encapsulated data to the cloud platform, where one of the service serial numbers includes a timestamp, the user information, the patient information, the clinical information, device information, and a quantity counter.

The security management unit is configured to authenticate identities of a device and an external system, permit access to the edge computing system, monitor a running status of the device and network in real time, timely issue a security warning, desensitize privacy information in the medical data, when the network of the cloud platform-edge computing system fails, trigger the system management unit to call function calculation, and maintain continuous running of the data service.

The edge database is configured to store various data of the edge computing system.

The beneficial effects of the above technical solution are as follows: By associating the service serial number with the user information, the clinical information and the data information, and performing bidirectional mapping and conversion with the device ID, the solution solves the problem of identifying different patients in the same device (the same hospital bed), and establishes reliable and efficient internal and external logical relations of data query and data interaction for a service of the cloud platform-edge computing system, which satisfies requirements for internal data query of the system and interaction with external data. The cloud platform can efficiently manage many edge computing systems. The edge computing systems can centrally manage diagnosis and treatment devices of users distributed in various ICU wards, breaking the "data island" of departments, reducing manual management costs of the users, improving the work efficiency of clinical data and medical quality, and reducing the labor intensity of medical care personnel.

Based on a further improvement on the foregoing system, the system management unit controls the edge computing system to directly connected to the service terminal device when the network failure of the cloud platform-edge computing system triggers callings of function calculation, to establish another data path; reads the medical data in the edge database to perform analysis and processing; performs a live broadcast on the service terminal device for visual display; and maintains continuous running of the data service.

The beneficial effects of the above technical solution are as follows: When the network of the cloud platform-edge computing system fails, the edge computing system is immediately triggered to take over medical data business, ensuring the security of system running and the continuity of the medical data business.

Based on a further improvement on the foregoing system, the data preprocessing unit is embedded with a plurality of communication protocols including: a TCP/IP protocol, an instant messaging protocol, an HL7 protocol, a DICOM protocol, a multi-media communication protocol, and an equipment manufacturer communication protocol, where the plurality of communication protocols are used to adapt to data communication interfaces of ICU diagnosis and treatment devices from different manufacturers and hospital internal information systems. In addition, the data preprocessing unit is embedded with an encryption protocol for encrypted data communication in the system.

Based on a further improvement on the foregoing system, the vital-sign monitoring device includes: multi-parameter monitors, hemodynamic monitors, blood gas analyzers, intracranial pressure monitors, electroencephalography monitors, urodynamic monitors, and fetal heart monitors; and the life support device includes: ventilators, continuous renal replacement therapies (CRRT), infusion pumps, intra-aortic balloon pumps (IABP), and extracorporeal membrane oxygenation systems (ECMO).

Based on a further improvement on the foregoing system, the cloud platform includes: a cloud-platform data communication subsystem, a cloud-platform data support subsystem, and a cloud-platform third-party-business subsystem, where the cloud-platform data communication subsystem is configured to perform data communication and business interaction between the cloud platform and the edge computing system, and between the cloud platform and the service terminal devices; the cloud-platform data support subsystem is configured to, by applying a deep learning framework for distributed parallel computing, analyze and calculate the medical data received by the cloud platform in real time, generate data analysis reports, and store data and files; and the cloud-platform third-party-business subsystem is configured to provide third-party-business services according to service instructions of the service terminal device, and perform auxiliary analysis and review on data processed in real time by the cloud-platform data support subsystem.

Based on a further improvement on the foregoing system, the data includes service instructions and medical data; and the cloud-platform data communication subsystem includes: data communication units, where the data communication units are configured to receive in real time the medical data sent by the edge computing system, and service instructions sent by the service terminal device, decrypt and store the medical data in a caching database, transfer the service instructions to the cloud-platform third-party-business subsystem, and select business service tasks. The data communication unit further performs interaction of encrypted data with the edge computing system and the service terminal device.

The cloud-platform third-party-business subsystem includes: a third-party-business service unit and a third-party-business terminal, where the third-party-business service unit is configured to receive service instructions and provide third-party-business services to users, and the third-party-business terminal is connected to the cloud platform for auxiliary analysis and review of the medical data, and visual management of processes and statuses of various business services.

The cloud-platform data support subsystem includes: a message bus unit, a data storage unit, a business arrangement unit, and a data analysis unit. The message bus unit is configured to connect and control data transmission between subsystems and units in the cloud platform. The data storage unit includes a clinical database, a file database, a business information database, and a caching database for storage and calling of data and files. The business arrangement unit is configured for unified management of the edge computing system accessing the cloud platform to perform business arrangement and scheduling. The data analysis unit is configured to read data in the caching database in real time and perform real-time analysis and processing, synchronously schedule the data to the third-party-business terminal for auxiliary analysis and review, store the data into the clinical database, and encrypt the data and transmit encrypted data to the edge computing system. The edge computing system decrypts the encrypted data, and updates the data in the edge database according to the service serial numbers.

The beneficial effects that can be obtained by using the above solution are as follows: the message bus unit supports, through service decoupling, message broadcasting, and peak shifting flow control of a message queue, bus data in running at a high speed among systems and units. The data storage unit integrates advantages of various databases and data storage service systems, and meets requirements for large-scale data collection and multi-data category management by a cloud-edge business collaboration architecture. The business arrangement unit centrally manages the edge computing systems accessing the cloud platform, and performs service arrangement and scheduling, which further improves resource utilization and operation efficiency of the cloud-edge business collaboration architecture, ensures stable operation in a high concurrency environment, and thus provides a resource environment for real-time processing of massive medical data. It should be noted that because the edge computing systems are distributed in different regions, and hardware systems, network bandwidths and service scales are different, the business arrangement unit encapsulates the edge computing systems (that is, edge nodes) into corresponding functional units according to service functions, and drives a service combination and calls functional unit through a function model to arrange and generate different types of edge node instances and configuration parameters. The quick integral deployment of the edge computing systems in the cloud platform improves the operation efficiency of the cloud-edge business collaboration architecture.

Based on a further improvement on the above system, the data analysis unit performs real-time analysis and screening on the medical data by using the deep learning framework based on distributed parallel computing. The data analysis unit, based on the deep learning framework for distributed parallel computing, reads the medical data in the caching database in real time, performs calculation and measurement, labeling, feature extracting, feature dimension vectorization processing, and creates a plurality of tasks in parallel by using the deep learning framework for distributed parallel computing, controls a central model function of a corresponding type to identify data of the corresponding type, and when identification results exceeds setting thresholds, marks attributes of the abnormal data. The third-party-business terminal synchronously performs real-time auxiliary analysis and review on measured and calculated values, marks, attributes and signs of abnormal data, statistical values of data, graphs and waveforms of data streams, wherein reviewed medical data including qualitative and quantitative data is stored into the clinical database for generating data analysis reports. The data analysis unit generates real-time data analysis reports based on features of the abnormal data, and attributes and durations of abnormal events, stores the reports into the file database, sends the reports to the service terminal device at the same time, and sends an abnormal-event warnings to the users. The data analysis unit integrates each patient's entire medical data, generates dynamic data analysis reports, stores the reports into the file database, and sends the reports to the service terminal device at the same time. The data analysis unit uses the qualitative and quantitative medical data to train and optimize each type of central model to obtain optimized central models of various types, and the deep learning framework for distributed parallel computing may be one of Spark, Samza, Storm, or Flink.

The beneficial effects of the above technical solution are as follows: By managing the edge computing system and the service terminal device through the cloud platform, a management scope and the number of users of third-party-business services are effectively expanded. The deep machine learning framework based on distributed parallel computing has the advantages of distribution, high throughput and self-learning, and supports the cloud platform to provide real-time processing services and data analysis reporting services for massive medical data for the edge computing systems of many users. The third-party real-time auxiliary analysis and review further ensures the data processing quality of the cloud platform, and the central model is optimized using the quantitative and qualitative data of the clinical database. This improves the accuracy of the central model and further improving the efficiency and quality of processing ICU massive medical data and data analysis reports. By analyzing and calculating in real time the medical data and contained device-initial-alarming-event data, screening abnormal data, and sending a warning to the user, the solution improves the accuracy of the abnormal-event warning, and effectively reduces serious troubles caused to medical staff by frequent false alarm events of the ICU diagnosis and treatment device in clinical application, and has wide applicability.

Based on a further improvement on the foregoing system, one of the service instructions of the service terminal device includes user information, permissions, instruction names, and parameters, and includes: real-time data service instructions, data invoking instructions, abnormal-data-event query instructions, data-analysis-report managing instructions, medical-document service instructions, data analysis and statistics instructions, user-defined item setting instructions, consultation initiating instructions, patient status evaluation instructions, device remote operation instructions, medical-collaboration information issuing instructions, and medical-tool-library query instructions, and the instructions may be embedded in the service terminal device, or may be temporarily input. Various types of third-party-business service subunits in the cloud platform authenticate and analyze the instructions, and execute the service instructions according to the instruction parameters. The service terminal device is able to input the service instructions through built-in artificial intelligence large language models (LLMs), and convert voice into service instructions according to a composition specification of the service instruction, and the LLMs may be one of LLaMA, ChatGPT, ChatGLM, StableLM, or MOSS.

The beneficial effects that can be obtained by using the above solution are as follows: Various onerous business work of medical care personnel related to the user, as well as operation procedures and contents are decomposed into service units running on the cloud platform. The user can quickly send an instruction to the cloud platform through the service terminal device, to gain support from a third-party-business service, and greatly reduces the workload of the medical care personnel. In addition, the cloud platform sets an authentication process for the user information and permission included in the service instruction, which ensures the security of the cloud platform and the third-party-business service.

Based on a further improvement on the foregoing system, the third-party-business service unit includes user-defined item setting subunits. One of the user-defined item setting subunits receives and parses the user-defined item setting instructions, authenticates user information and validity statuses of permissions that are carried by the instructions, sends response messages with license information to the service terminal device, and permits the user to edit, set and update user-defined items. The cloud platform executes new setting and updates the edge computing system. Records of the setting operation are stored into the business information database. The user-defined items include: system file configurations, business rule configurations, third-party service item selections, message notification manners and scopes, and user-operation-interface settings.

The beneficial effects that can be obtained by using the above solution are as follows: The solution provides a convenient tool of setting the user-defined terms to the user, supporting the user to configure a system configuration, a rule configuration of business, a mode and scope of message notification, options of items of a third-party service, and a user operation interface according to requirements and habits of the user. The solution improves convenience and user experience, and stores a record of the operation of setting user-defined items, effectively guaranteeing the security of the cloud platform, the edge computing system and the business service.

Based on a further improvement on the foregoing system, the third-party-business service unit includes data service subunits, where one of the data service subunits receives and parses real-time data service instructions, authenticates user information and validity statuses of permissions that are carried by the instructions, and controls the data communication unit to receive the medical data sent by the edge computing system in real time, and decrypt and store the medical data into the caching database. The data analysis unit reads the medical data in the caching database in real time, performs real-time analysis and auxiliary review, stores the data into the clinical database, generates data analysis reports at the same time, and sends auxiliary-reviewed data and the data analysis reports to the service terminal device for real-time live broadcast, browsing and reading. Records of the real-time data service operation are stored into the business information database.

The beneficial effects that can be obtained by using the above solution are as follows: By authenticating the user information and the validity status of permission that are carried by the real-time data service instruction, invalid access is controlled, safe and reliable operation of the cloud platform is guaranteed, the problem that the ICU medical data is difficult to be analyzed and interpreted in real time and there is a lack of data analysis reports is solved, the problem of lack of storage, management and reuse of ICU medical data in hospitals at all levels is solved, users are supported to improve a status of a clinical medical service, and medical quality and work efficiency are improved. The cloud platform stores records of real-time data service operations to ensure the security of business services.

Based on a further improvement on the foregoing system, the third-party-business service unit includes data invoking subunits, where one of the data invoking subunits receives and parses the data invoking instruction, authenticates user information and validity status of permissions that are carried by the instructions, according to parameter information of the instructions, retrieves and invokes data that meets the instruction parameters, and provides the invoked data to the service terminal device for browsing and reading. Record of the data invoking operation are stored in the business information database. The data type includes: real-time data, historical data, and data analysis reports.

The beneficial effects that can be obtained by using the above solution are as follows: The solution provides a convenient data invoking tool to the user, which supports the user to quickly acquire accurate and complete medical data information, knows a variation of the illness of a patient, evaluates a medical effect, and prepares a medical decision-making solution, which improves the quality of medical care and the working efficiency. Moreover, the record of the data invoking operation is stored, which guarantees the data security of the cloud platform and the user.

Based on a further improvement on the foregoing system, the third-party-business service unit includes medical-document managing subunits, where one of the medical-document managing subunit receives and parses the medical-document service instructions, authenticates user information and validity statuses of permissions that are carried by the instructions, and according to parameter information of the instructions, retrieves and selects medical documents that meets the instruction parameters. The service terminal device performs operations of creation, editing, inquiry, maintenance and storage through embedded voice, handwriting and spelling LLMs. Records of the management operation are stored in the business information database. Types of the medical documents include: clinical orders, nursing forms, electronic medical records, statistics data sheets, clinical logs, and customized files; and the LLMs configured in the service terminal device may be one of the following common tools: LLaMA, ChatGPT, ChatGLM, StableLM, or MOSS.

The beneficial effect that can be obtained by using the above solution are as follows: The solution provides a convenient electronic tool of medical documents to the user, which converts tedious handwriting transcription or keyboard entering of various medical documents of the user into voice, handwriting, and spelling input of the service terminal device of the user. This reduces the operation complexity for medical care personnel, improves work efficiency, and application of artificial intelligence voice tools, and further improves the quality of medical documents. In addition, the record of medical document management operation is stored, which grantees the reliability, security, and traceability of medical documents.

Based on a further improvement on the foregoing system, the third-party-business service unit includes device remote operation service subunits, where one of the device remote operation service subunits receives and parses the device remote operation instructions, authenticates user information and validity statuses of permissions that are carried by the instructions, and retrieves a single or a plurality of diagnosis and treatment device IDs according to service serial numbers mapped by a single or a plurality of pieces of patient information in the instruction parameters. The service terminal device connects, through the cloud platform-edge computing system, to an ICU diagnosis and treatment device that meets the instruction parameters, remotely controls and adjusts the working mode of the device, performs status query, configuration modification, device maintenance, and data observation operations, and the obtained data is stored corresponding database according to the data type. Records of the device remote operation are stored in the business information database.

The beneficial effects that can be obtained by using the above solution are as follows: The solution provides a convenient tool of a device remote operation to the user, which supports the user-service terminal device to remotely control the ICU diagnosis and treatment device, change/adjust the working mode of the device, and adjust a working status of the device in a timely manner, which meets the treatment need of a patient. In addition, the record of the device remote operation is stored, which grantees the security of the cloud platform and a clinical medical service of the user.

Based on a further improvement on the foregoing system, the third-party-business service unit includes consultation service subunits, where one of the consultation service subunits receives and parses the consultation initiating instructions, authenticates user information and validity statuses of permissions that are carried by the instructions, according to patient information and information of a consultant in the instruction parameters, sends notices of starting multimedia consultation to the consultant through the cloud platform, establishes multimedia data links between the initiator and the consultant, maps service serial numbers according to the patient information, shares patient data, conducts bedside multimedia audio-video and medical data consultation, and stores file data of the consultation in the file database. Records of the consultation service operation are stored into the business information database.

The beneficial effect that can be obtained by using the above solution are as follows: The solution provides a convenient tool of consultation and communication for ICUs of small and medium-sized hospitals, which quickly establishes a platform of sharing medical data and medical resources between the small and medium-sized hospitals and large-sized hospitals, to conduct consultation and on-site observation for high-risk intractable patients on the cloud platform, analyze medical data, and guide the small and medium-sized hospitals to make clinical medical decisions. This improves medical levels of ICUs of small and medium-sized hospitals and the utilization of medical resources of the society.

Based on a further improvement on the foregoing system, the third-party-business service unit includes medical-collaboration information issuing subunits, where one of the medical-collaboration information issuing subunits receives and parses the medical-collaboration information issuing instructions, authenticates user information and validity statuses of permissions that are carried by the instructions, according to patient information, information about medical collaboration teams, and illness levels in the instruction parameters, sends collaboration information to service terminal devices of the medical collaboration teams through the cloud platform, and prompts with sound, light, vibration, graphics and text. The service terminal devices of the medical collaboration teams map service serial numbers according to the patient information, invokes medical data for reading and browsing, and quickly gives a diagnosis and treatment opinion. Record of the medical-collaboration information issuing operation are stored into the business information database.

The beneficial effects that can be obtained by using the above solution are as follows: The user is supported to use the cloud platform to establish a multidisciplinary medical cooperative emergency rapid response team (RRT), to centralize multidisciplinary medical resources to provide all-round medical services for high-risk intractable patients, and centralize multidisciplinary medical resources in the shortest time to provide all-round treatment when ICU patients are in a high-level emergency state. "One-click" startup and pre-reading of medical data, overcomes the disadvantage that the user relies on manual calling to centralize medical resources and improves the medical quality and work efficiency of the user.

Based on a further improvement on the foregoing system, the third-party-business service unit includes medical-tool-library service subunits, where one of the medical-tool-library service subunits receives and parses the medical-tool-library query instructions, authenticates user information and validity statuses of permissions that are carried by the instructions, and according to query data types in the instruction parameters, permits the service terminal device to connect to medical tool libraries, to browse, read, operate and use. Records of the medical-tool-library query operation are stored in the business information database. One of the medical tool libraries includes ICU common drug management sub-libraries, clinical medical data sub-libraries and ICU device management sub-libraries.

The beneficial effects that can be obtained by using the above solution are as follows: The cloud platform centrally manages tools and materials required for the daily work of ICUs and continuously updates them, and collects professional materials of clinical concern to provide services for medical staff related to the user. The medical staff can quickly get support and help through service terminal devices and various application tools configured for the devices, which can improve the work efficiency and save time.

According to another aspect, an embodiment of the present application provides a cloud-edge collaborative processing method for ICU data based on third-party business, including acquiring multi-source heterogeneous medical data output by an ICU diagnosis and treatment device, where the ICU diagnosis and treatment device includes a plurality of vital-sign monitoring devices and a plurality of life support devices;

performing, by an edge computing system, preprocessing of resolving, classification, and data-format standardization on the medical data, and storing the medical data in a standard format in an edge database;

respectively connecting a cloud platform to the edge computing system and a service terminal device, and performing interaction of encrypted data, where the data includes service instructions and medical data;

where the service terminal device includes a plurality of medical-staff handheld terminals and a plurality of ward data terminals, and connecting the edge computing system to hospital internal information systems of users to perform data interaction and obtain user information, patient information, and clinical information.

Based on a further improvement on the foregoing method, performing preprocessing of resolving, classification, and data-format standardization on the multi-source heterogeneous medical data by the edge computing system, to generate the medical data in the standard format, a device-initial-alarming-event sign is reserved.

ID codes of ICU diagnosis and treatment devices and patient information are bound to generate service serial numbers; one of the service serial numbers and the preprocessed medical data are integrally encapsulated; and encapsulated data is stored into the edge database.

One of the service serial numbers includes a timestamp, the user information, the patient information, the clinical information, device information, and a quantity counter.

Respectively connecting cloud platform to the edge computing system and service terminal device, and performing interaction of encrypted data further includes:

receiving in real time medical data sent by the edge computing system, and service instructions sent by the service terminal device, decrypting and storing the medical data into a caching database, and providing users with third-party-business services according to the service instructions and parameters carried by the service instructions;

reading data in the caching database in real time for analysis, and calculation and auxiliary analysis and review, storing the data into a clinical database, generating data analysis reports, and sending the reviewed data and the data analysis reports to the service terminal device for real-time live broadcast, browsing, and reading;

receiving, by the edge computing system, data and control instructions returned by the cloud platform, and performing various business tasks, including updating programs, file configurations, and data in the edge database; providing required medical data to the hospital internal information systems of users through the edge computing system; and monitoring network running statuses through a security management unit in the edge computing system, discovering network failure events, triggering system management unit to call function computing, controlling the edge computing system to directly connect to the service terminal device, reading the data in the edge database in real time to perform analysis and calculation, performing a live broadcast for visual display on the service terminal device to maintain continuous running of various business tasks, and when the network of cloud platform-edge computing system resumes data communication, encrypting data during the network failure and transmitting encrypted data to the cloud platform to restore cloud-platform-business service functions.

Based on a further improvement on the foregoing method, the cloud platform includes: a cloud-platform data communication subsystem, a cloud-platform data support subsystem, and a cloud-platform third-party-business subsystem, and the method includes: reading the medical data in the caching database in real time through a data analysis unit of the cloud-platform data support subsystem, screening and identifying abnormal data in real time, finding the abnormal data, and marking attributes of an events;

synchronously performing, by a third-party-business terminal of the cloud-platform third-party-business subsystem, real-time auxiliary analysis and review on measured and calculated values, marks, attributes and signs of an abnormal events, statistical values of data, graphs and waveforms of data, where reviewed medical data including qualitative and quantitative data is stored into the clinical database;

visually managing the processes and statuses of the third-party-business service through the third-party-business terminal;

generating, by the data analysis unit, real-time data analysis reports based on features of the abnormal data, abnormal events, and durations, storing the reports into a file database, sending the reports to the service terminal device at the same time, and sending abnormal-event warnings to the users;

integrating, by the data analysis unit, each patient's entire medical data, generating dynamic data analysis reports, storing the reports into the file database, and sending the reports to the service terminal device at the same time; using, by the data analysis unit, the qualitative and quantitative medical data to train and optimize each type of central models to obtain optimized central models of various types, synchronously encrypting and sending data after auxiliary analysis and review by the cloud platform to the edge computing system.

Compared with some implementations, the present application can realize at least one of the following beneficial effects:

1. The cloud platform-edge computing system performs collaborative processing on huge multi-source heterogeneous medical data of ICU diagnosis and treatment devices, unifies a data format, which reduces the complexity and amount of upstream data, shortens the network delay, reduces network bandwidth costs, greatly improves a load capacity of the cloud platform, and the computing efficiency and storage capacity of massive data, reduces operation costs, and solves the bottleneck and deficiency of ICU medical data processed by existing centralized cloud platform business architecture.

2. Through independent working characteristics of the edge computing system, the medical data business is taken over automatically to grantee the security of the system running and continuity of the medical data business, when a network of the cloud platform-edge computing system fails. This solves the problem of paralysis of the medical data business caused by the network failure in the existing centralized cloud platform architecture technology.

3. Through the uniqueness of the service serial number and the bidirectional mapping logical relation, the present application not only solves the problem of patient identification, but also establishes efficient and reliable internal and external logical relations of data query and data interaction for a service of the cloud platform-edge computing system, which satisfies requirements for internal data query of the system and interaction with external data, and greatly improve the operating efficiency of the cloud-edge business collaboration architecture and reduces resource consumption.

4. The deep learning framework based on distributed parallel computing supports the cloud platform to provide real-time processing services for massive medical data. The third-party real-time auxiliary analysis and review further improves the quality of data processing, and solves the problem that ICU medical data in hospitals at all levels is difficult to be analyzed and interpreted in real time, and the problem of lack of data analysis reports. This supports a user to improve a clinical medical service, and improve the medical quality and work efficiency.

5. Various onerous ICU business work of the user and procedures and content are decomposed into service units running on the cloud platform, which provides the user with third-party-business services, and greatly reduce the labor intensity of medical care personnel. A third-party-business terminal of the cloud platform visually manages processes and statuses of the business services to ensure the quality of third-party services.

In the present application, the above technical solutions may be combined, to implement more preferable combined solutions. Other characteristics and advantages of the present application will be described in the subsequent description, and part of the advantages can become apparent from the description or be understood by the implementation of the present application. The objectives and other advantages of the present application can be implemented and obtained from the content particularly illustrated in the description and the drawings.

BRIEF DESCRIPTION OF THE DRAWINGS

The drawings are merely for the purpose of illustrating the particular embodiments, and are not considered as limitation to the present application. Throughout the drawings, the same reference signs denote the same elements.

DETAILED DESCRIPTION

Figure 1:
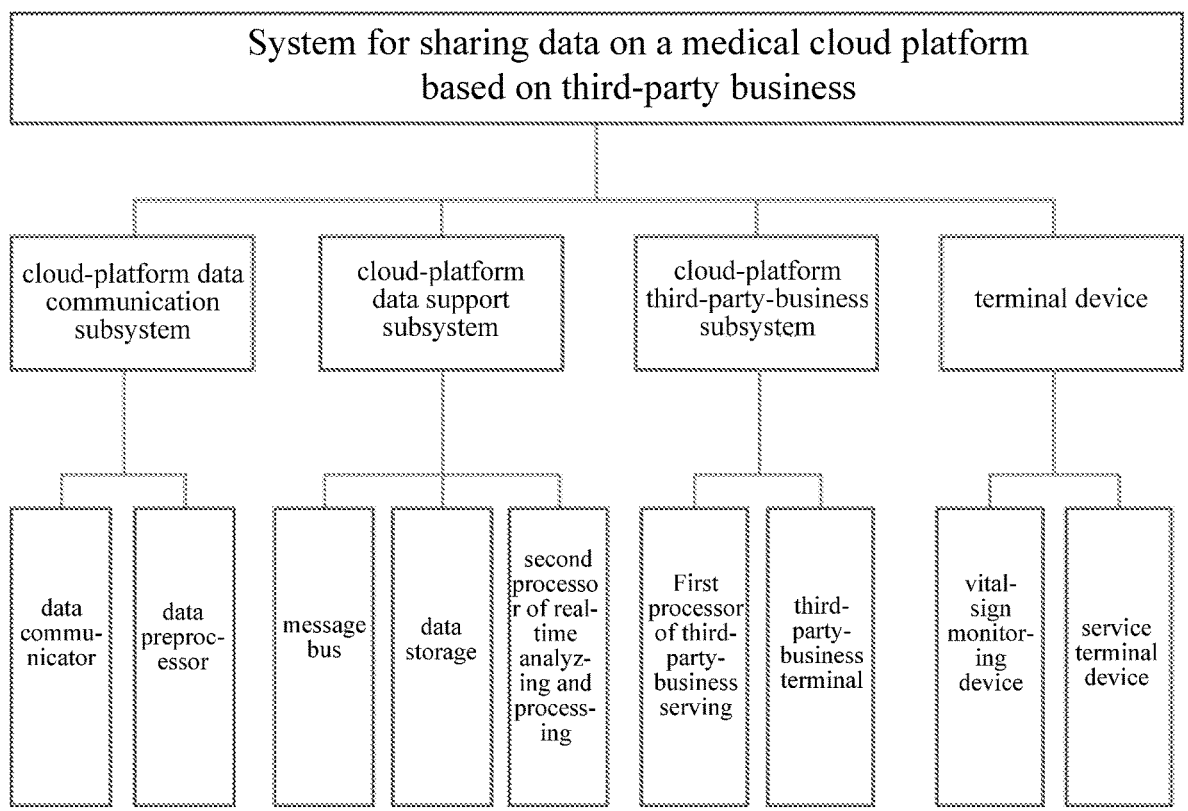
FIG. 1 is a block diagram of the system for sharing data on a medical cloud platform based on third-party business according to a first embodiment of the present application.

The preferable embodiments of the present application will be particularly described below by referring to the drawings. The drawings form part of the present application, are used to explain the principle of the present application together with the embodiments of the present application, and are not limiting the scope of the present application.

A first embodiment of the present application discloses a system for sharing data on a medical cloud platform based on third-party business. As shown in FIG. 1, the system comprises: a terminal device and a cloud platform;
  the cloud platform comprises: a cloud-platform data communication subsystem, a cloud-platform data support subsystem and a cloud-platform third-party-business subsystem;
  the cloud-platform data communication subsystem is configured for data communication between the cloud-platform third-party-business subsystem and the terminal device;
  the cloud-platform data support subsystem is configured to, by applying a deep-learning framework of distributed parallel computation, process and store in real time data received by the cloud-platform;
  the cloud-platform third-party-business subsystem is configured to provide third-party business according to a service requesting instruction of the terminal device, and is further configured to perform auxiliary analysis and checking on abnormal data that are processed by the cloud-platform data support subsystem; and
  the terminal device comprises: a service terminal device and a vital-sign monitoring device, and is configured to send data to the cloud-platform according to a destination address, and receive service of the third-party business.

The cloud-platform data communication subsystem comprises: a data communication unit and a data preprocessing unit. The data communication unit is configured to connect various terminal devices, and receive in real time data of a plurality of terminal devices, and is configured for data interaction.

The data preprocessing unit is configured to bind an ID code of a vital-sign monitoring device and patient information to generate a service serial number, and simultaneously perform resolving, classification and data-format standardizing processing of the vital-sign data, reserve a device-initial-alarming-event sign, encapsulate integrally the service serial number and the data as preprocessed, and save the encapsulated data into a vital-sign database.

The cloud-platform third-party-business subsystem comprises: a third-party-business service unit and a third-party-business terminal; the third-party-business service unit is configured to receive the service instruction, and provide a third-party-business service to the user; and the third-party-business terminal is configured for the auxiliary analysis and processing of the data of the cloud platform.

The cloud-platform data support subsystem comprises: a message bus unit, a data storage and a real-time analysis and processing unit;
  the message bus unit is configured to connect and control the transmission of data and instructions among the subsystems and the units, the message bus unit, the data storage, the data communication unit and the data preprocessing unit;
  the data storage comprises the vital-sign database, a file database, a business-information database and a buffer database, and is configured for data storage and invoking; and
  the real-time analysis and processing unit is configured to read in real time data in the vital-sign database, perform analysis and processing of it, and generate a data analysis report.

In the implementation, the cloud platform is connected to the vital-sign monitoring device (exemplarily, the vital-sign monitoring terminal device may be a multiple-parameter monitoring device, a respiration-function monitoring device, an intracranial-pressure monitoring device, and a fetal-heart-rate monitoring device), the service terminal device and the third-party-business terminal, to perform data interaction; the service terminal device, according to the destination address, sends a real-time-data service instruction to the cloud platform, the third-party-business service unit resolves the instruction, authenticates a validity state of the ID code of the vital-sign monitoring device that is carried by the instruction, sends a response message carrying license information to the data communication unit, and permits to receive the vital-sign data, and the data communication unit establishes a connection according to a type of communication protocol, receives the data, and transmits to the data preprocessing unit; the data preprocessing unit binds the ID code of the vital-sign monitoring terminal device and the patient information in it to generate a service serial number, and simultaneously performs resolving, classification and data-format standardizing processing of the vital-sign data, reserves a device-initial-alarming-event sign, encapsulates integrally the service serial number and the data as preprocessed, and saves the encapsulated data into a vital-sign database, the real-time analysis and processing unit reads in real time the data in the vital-sign database and the contained device-initial-alarming-event data, analyzes, calculates and screens abnormal vital-sign data that exceed a preset reference, generates the data analysis report, and sends the data analysis report to the user terminal device, and the user may read, browse, download and print the report, as the basis of clinical medical treatment. The cloud platform, by business flow control and data dispatching, performs data interaction with the third-party-business terminal, the third-party-business terminal performs auxiliary analysis and checking to the data that have been analyzed and screened, and the real-time analysis and processing unit, according to the result of the auxiliary analysis and checking, updates the patient data in the vital-sign database, and generates the data analysis report; and the user may send a service instruction to the cloud platform, to obtain the support from various third-party-business services.

As compared with some implementations, the cloud platform can connect to various different terminal devices of the users via a network, analyze in real time a massive quantity of vital-sign data, screen abnormal data, and generate the data analysis report, which effectively reduces device-false-alarming events, which frequently happen in the process of vital-sign monitoring, improves the quality of medical care and the working efficiency, and reduces the labor intensity of the medical care personnel. The auxiliary analysis and checking by a third party can guarantee the quality of the data analysis of the cloud platform. The user terminal device can send an instruction to the cloud platform, to obtain the support from various third-party-business services, which has an extensive applicability.

It should be noted that the service terminal device and the third-party-business terminal, which are connected to the cloud platform, include at least one of a computer device, an interactive touch-screen device, a hand-held mobile device and a multi-media device, and the cloud platform may also be connected to a Hospital Internal Information System (HIS), an intensive-care-unit Clinical Information System (CIS), and an Application Programming Interface (API) of a physical examination organization, a health control organization or an insurance organization.

Particularly, the data communication unit has built-in communication protocols, and is configured to be connected to various different terminal devices and external systems, receive in real time the uploaded data, send the service instruction in the data to the third-party-business service unit, and transmit the vital-sign data to the data preprocessing unit.

The data preprocessing unit contains a system coding schedule, and is configured to preprocess the acquired data of each of the users, generate the service serial number of the patient, encapsulate integrally the service serial number and the data as preprocessed, and save the encapsulated data into a vital-sign database, and the real-time analysis and processing unit reads in real time data in the vital-sign database, and performs analyzing, screening and processing. Particularly, the process comprises:

based on a system coding-schedule regulation, binding the acquired ID code of the vital-sign monitoring terminal device and the patient information, and generating the service serial number of the patient;

performing resolving, classification and data-format standardizing processing to the received vital-sign data, and reserving the identifier of device-initial-alarming-event data; and encapsulating integrally the service serial number of the patient and the vital-sign data as preprocessed, and saving the encapsulated data into a vital-sign database.

In order to solve the problem of the incompatibility of the data formats and the communication protocols of the devices of different manufacturers, and solve the problem of identifying different patients in the same vital-sign monitoring device (the same hospital bed), the data communication unit supports multiple communication protocols, including, for example, a TCP/IP protocol, an instant messaging protocol, an HL7 protocol, a DICOM protocol, a multi-media communication protocol, and an equipment manufacturer communication protocol. The data communication unit is configured to automatically identify the user identity and the ID code of the terminal device, establish a network connection, and receive the data. The data preprocessing unit is configured to, based on a system coding-schedule regulation, control to bind the ID code of the vital-sign monitoring terminal device in the data and the patient information, and generate a service serial number (wherein the code of the service serial number contains time stamp, patient information, user information, device information and quantity counter), and simultaneously perform resolving, classification and data-format standardizing processing of the vital-sign data, encapsulate integrally the service serial number of the patient and the data as preprocessed, and provide to the cloud-platform system for storing, reading, invoking, analyzing and calculating.

It should be noted that the data communication subsystem of the cloud platform supports multiple communication protocols, and the data-format standardizing processing, and the service serial number and the ID of the vital-sign monitoring device may maintain bidirectional mapping and conversion, for the addressing and identifying of data inquiring and data interaction, thereby establishing flexible and high-efficiency data communication interfaces for the cloud-platform system, and the identifiers of the patient and the data, which satisfies the demands of the users on the access and data interaction of vital-sign monitoring devices and external systems of various different manufacturers, and extends the business scope and the service contents.

The message bus unit of the present embodiment employs message queue communication protocol, including message service and message queue interfaces, and is configured for the cloud-platform system to connect and control the business message notification and the business data transmission between the subsystems and the units, the message bus unit, the data storage, the data communication unit and the data preprocessing unit. The message queue, by business decoupling, message broadcasting and peak shifting flow control, supports the bus to transmit in real time a great quantity of messages of the system, and the reliable delivery of the message transmission, which improves the operation efficiency of the cloud-platform system.

The vital-sign database employs a structured data service system, and is configured to store the vital-sign data that have been resolved, classified and data-format standardizing processed, support high-concurrency real-time inquiries, and provide the capacities of massive storage and real-time inquiry, wherein the vital-sign data include waveform-type data and numerical-value-type data.

The file database employs an object storage service system, and is configured to store various files generated by the business system, and upload the data files to the storage space in the form of objects, wherein the files include unstructured data files such as files of patient information, files of clinical information, files of vital-sign-data reports, files of medical documents, files of multi-media video, files of medical reference books and so on.

The business-information database employs a database of relational-model-organization data, and is configured for the cloud platform to store structured business data, and control the inquiring and storage of the data of the business logical relations between the units, which has the advantage of maintaining the data consistency.

The buffer database employs a non-relational database, and is configured to control the data exchange between the units and the state maintaining, and also configured to buffer the results of database inquiring, which reduces the times of the accessing the database, and increases the response speed of the cloud platform.

It should be noted that the data storage of the present embodiment integrates the advantages of the various databases and data storage service systems, solves the problem of managing large-scale data collections, diverse data structures and diverse data categories by the cloud platform, and supports the operation of the cloud platform in high-concurrency environments.

Figure 3:
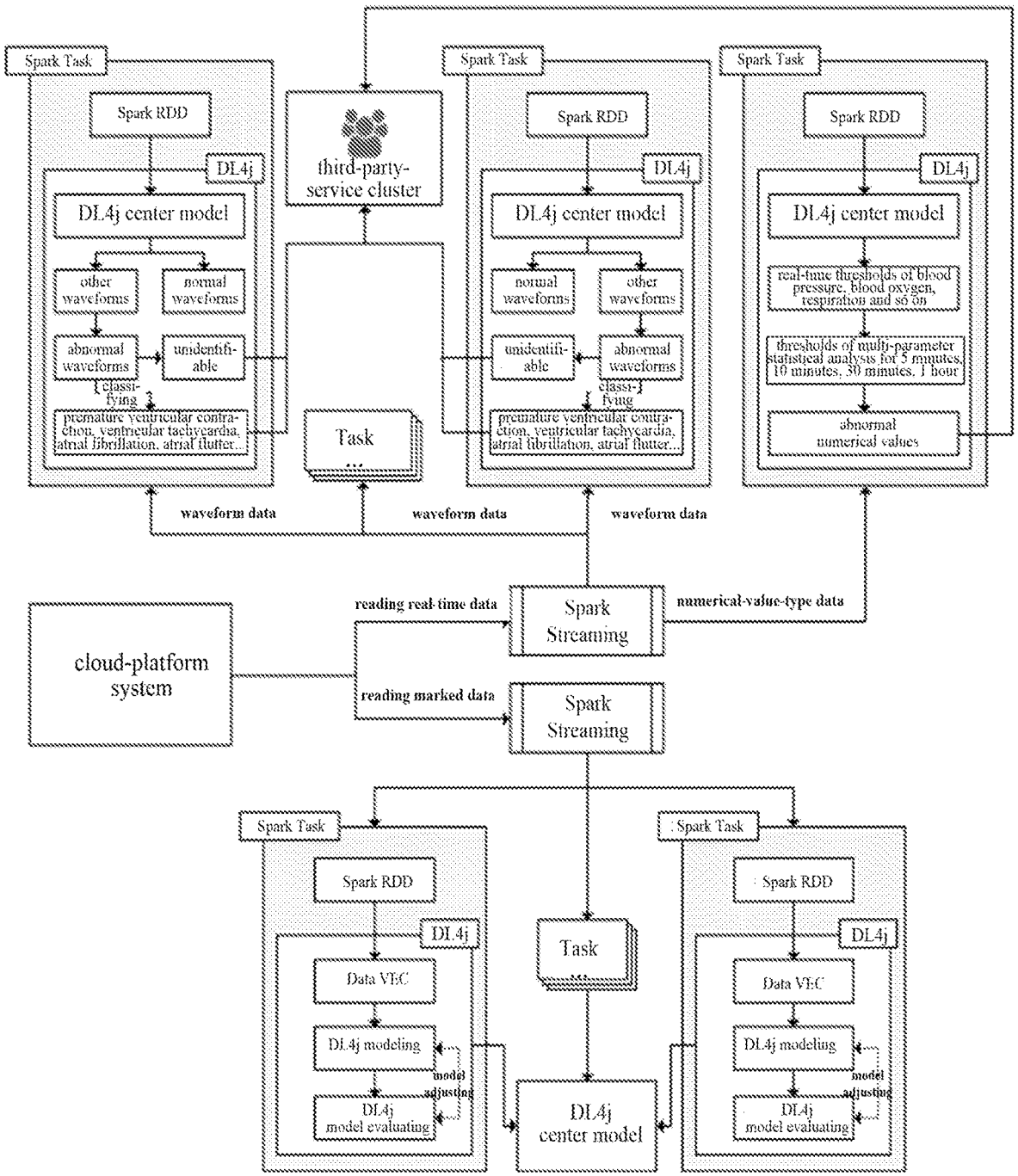
FIG. 3 is a diagram of deep-learning framework based on Spark distributed parallel computation according to a first embodiment of the present application.

The real-time analysis and processing unit is configured for processing in real time the vital-sign data. As shown in FIG. 3, the present embodiment employs the deep-learning framework of the Spark distributed parallel computation to read in real time the vital-sign data in the vital-sign database and the contained device-initial-alarming data, wherein the Spark engine is configured to, according to a preset micro-batching time interval, create in parallel a plurality of tasks, and trigger a Spark Streaming to split the data by types into RDD data collections, and simultaneously control a center model of a corresponding type to calculate and process the type of data; and the process comprises the steps of: by the center model, when abnormal data that exceed a preset reference are found by the calculating and processing, analyzing features of the abnormal data, calculating a duration, and marking an attribute of the abnormal data;

by the real-time analysis and processing unit, generating a real-time-data analysis report from the abnormal data, and sending an abnormal-event warning to the user;

by the real-time analysis and processing unit, integrating the vital-sign data of a whole process of a user that have been analyzed and screened, outputting the vital-sign data, and generating a dynamic-data analysis report;

by the real-time analysis and processing unit, saving the real-time-data analysis report and the dynamic-data analysis report into the file database; and by the real-time analysis and processing unit, by using the quantitative and qualitative vital-sign data that have been analyzed and screened in the vital-sign database, learning, training and optimizing in real time a center model of each type, to obtain a new center model of the type of data.

In the above steps, the third-party-business terminal performs real-time auxiliary analysis and checking to the vital-sign data that have been processed, and the real-time analysis and processing unit, according to a result of the auxiliary analysis, updates the data in the vital-sign database, and uses the data to generate the data analysis report.

It should be emphasized that the real-time analysis and processing unit employs the deep-learning framework based on distributed parallel computation, which may be one of the universal frames of Spark, Storm, Flink and Samza. The deep-learning framework based on distributed parallel computation has the advantages of real-time calculation of stream data, high throughput and self-learning, greatly improves the real-time processing speed of the massive quantity of vital-sign data, effectively reduces false-alarming events, which frequently happen in the process of vital-sign monitoring, and reduces the labor intensity and the working pressure of the medical care personnel.

The center model includes two types of center models, wherein one type analyzes and calculates the patterns, rhythms and speeds of waveform-type data, and the other type analyzes and calculates the amplitudes of numerical-value-type data. The center model comprises a built-in second-order-difference calculating tool and logic analyzing tool, and is configured to calculate and analyze in real time the patterns, rhythms, speeds and numerical values of the vital-sign data, classify and mark the waveforms, count and summarize the numerical values, and screen abnormal data that exceed a reference. In order to improve the efficiency and accuracy of the analyzing and screening of the center model, the method further comprises, by using the quantitative and qualitative vital-sign data in the vital-sign database, learning, training and optimizing in real time the center model of each type, to obtain a new center model of the type of data.

It should be noted that the vital-sign data that are analyzed and processed in the present embodiment include the data of electrocardiogram, respiration, non-invasive blood pressure, invasive blood pressure, oxyhemoglobin saturation, body temperature, pulse rate, intracranial pressure, end-tidal carbon dioxide and fetal heart rate; the waveform-type vital-sign data include: overall cardiac activity of whole process, electrocardiogram interval, QRS time limit, ST-segment evaluation pattern, QT interval, total respiration number of whole process, respiratory-wave interval, peak and trough values of pulse volume, peak and trough values of intracranial pressure, peak and trough values of partial pressure of end-tidal carbon dioxide and wave interval of partial pressure of end-tidal carbon dioxide; and the numerical-value-type vital-sign data include: systolic pressure and diastolic pressure in non-invasive/invasive blood pressure, pulse rate, oxyhemoglobin saturation, body temperature and fetal heart rate of whole process; stroke volume, cardiac index and total value of peripheral resistance of non-invasive heart stroke; and value of airway pressure, value of airway flow rate and value of airway volume of respiratory mechanics.

The features of abnormal data include: tachycardia, bradycardia, flutter-fibrillation, frequent premature beat, cardiac arrest, RonT, QT interval extension, ST-segment rising/descending, apnea, bradypnea, tachypnoea, rising/descending of oxyhemoglobin saturation, rising/descending of systolic pressure and diastolic pressure, rising/descending of mean arterial pressure, rising/descending of peak value of pulse volume, rising/descending of peak value of intracranial pressure, rising/descending of peak value of partial pressure of end-tidal carbon dioxide, rising/descending of fetal heart rate, descending of non-invasive heart stroke, and rising/descending of values of respiratory mechanics.

The center model, when abnormal data that exceed a preset reference are found by the analysis and processing, analyzes features of the abnormal data, calculates a duration of an abnormal event, and marks an attribute of the abnormal data, and simultaneously, the real-time analysis and processing unit generates a real-time-data analysis report from the abnormal data, stores the real-time-data analysis report, and according to the device ID mapped by the service serial number of the patient, sends an abnormal-event warning to the user, and simultaneously sends the real-time-data analysis report to the user. It should be noted that the above preset references employ the internationally commonly used diagnostic criteria of vital-sign data as the references of the analysis and calculation.

The contents of the dynamic-data analysis report that is generated by the real-time analysis and processing unit of the present embodiment include: for the whole process, comprehensive analysis and calculation, classification and marking of waveforms and oscillograms of data of dynamic electrocardiogram, data of dynamic blood pressure, data of respiration, data of oxyhemoglobin saturation, data of invasive blood pressure, data of intracranial pressure, data of partial pressure of end-tidal carbon dioxide, data of body temperature, data of fetal heart rate, data of non-invasive heart stroke, and data of respiratory mechanics, and their tendency charts, histograms, scatter plots, and diagrams of variability analysis.

The contents of the generated real-time-data analysis report include: real-time analysis and calculation, classification and marking of waveforms, and abnormal oscillograms of data of abnormal electrocardiogram, data of abnormal blood pressure, data of abnormal respiration, data of abnormal oxyhemoglobin saturation, data of abnormal intracranial pressure, data of abnormal partial pressure of end-tidal carbon dioxide, data of abnormal body temperature, data of abnormal fetal heart rate, data of abnormal non-invasive heart stroke, and data of abnormal respiratory mechanics, and their tendency charts.

The cloud platform saves the above data analysis reports into the file database, and the user may send a data invoking instruction to the cloud platform, to perform retrieving, inquiring, statistical analysis, reviewing and summarizing.

In order to solve the working pressure of the complicated and onerous vital-sign monitoring of the users (including hospitals, medical care personnel, patients, other facilities and so on), the users, on the basis that the corresponding privileges have been acquired, send a service instruction to the cloud platform, and the third-party-business service unit resolves and authenticates the received service instruction, and, according to parameters carried by the service instruction, provides a third-party-business service to the user.

The service instruction is formed by an instruction name and a parameter, and particularly includes: a real-time-data service instruction, a data invoking instruction, an abnormal-data-event inquiring instruction, a data-analysis-report managing instruction, a medical-document service instruction, a data analyzing and counting instruction, a user-self-defined-term setting instruction, a consultation initiating instruction, a patient-state evaluating instruction, a device-remote-operation instruction, a medical-cooperation-information issuing instruction, and a medical-tool-library inquiring instruction. It should be noted that the service-instruction parameters are formed by user information, user privileges and instruction contents. The user sends a service instruction to the cloud platform via the terminal device, the data communication unit sends the received service instruction to the third-party-business service unit for resolving and authenticating, and the third-party-business service unit provides the third-party-business service to the user according to the service-instruction parameters. The third-party-business service unit includes: a real-time-data-service unit, a data invoking unit, a medical-document managing unit, a user-self-defined-term setting unit, a consultation-service unit, a device-remote-operation unit, a medical-cooperation-information issuing unit, a patient-state evaluating unit, a data-analysis-report managing unit, a data analyzing and counting unit and a medical-tool-library-service unit.

The present embodiment divides and integrates the processes and contents of the diverse and complicated businesses of the user in a modular manner, and migrates them to the cloud platform for automated implementation, and the user obtains multiple stable and high-efficiency third-party-business services, which reduces the labor intensity and the working pressure of the medical care personnel.

Exemplarily, the real-time-data-service unit is configured to, by the cloud platform, receive the real-time-data service instruction, resolve the instruction, authenticate a validity state of the ID code of the vital-sign monitoring device that is carried by the instruction, control the data communication unit to receive the vital-sign data, transmit the vital-sign data to the data preprocessing unit to preprocess, generate a service serial number, encapsulate integrally with the data as preprocessed, and save the encapsulated data into a vital-sign database, and by the real-time analysis and processing unit, read in real time data in the vital-sign database, process the data, generate the data analysis report, and send the data analysis report to the service terminal device for browsing and reading.

Exemplarily, the data invoking unit is configured to, by the cloud platform, receive the data invoking instruction, resolve the instruction, authenticate user information and a validity state of user privilege that are carried by the instruction, send a response message carrying license information to the service terminal device, according to the patient information and a type of the invoked data carried by the instruction, map the service serial number of the patient, perform data retrieving and invoking, and provide the invoked data to the service terminal device for browsing, reading, real-time live broadcast, and historical playback; a record of the data invoking operation is saved into the business-information database; and the types of the invoked data include: real-time/historical vital-sign data, a data-analysis-report file, an image-video file, a multi-media video file and a medical-document file.

Exemplarily, the medical-document managing unit is configured to, by the cloud platform, receive the medical-document service instruction, resolve the instruction, authenticate user information and a validity state of user privilege that are carried by the instruction, send a response message carrying license information to the service terminal device, according to the patient information and information of a type of the medical document carried by the instruction, map the service serial number of the patient, retrieve the medical document that meets the instruction parameters, and provide the medical document to the service terminal device, and by the service terminal device, perform managing operations of creating, editing, inquiring, maintaining and storing by handwriting, voice or spelling; a record of the managing operations is saved into the business-information database; and the information of the types of the medical document includes: a long-term medical advice, a temporary medical advice, a nursing form and an electronic case history.

Exemplarily, the device-remote-operation-service unit is configured to, by the cloud platform, receive the device-remote-operation instruction, resolve the instruction, authenticate user information and a validity state of user privilege that are carried by the instruction, and send a response message carrying license information to the service terminal device, and simultaneously, according to information of one or more patients carried by the instruction, map IDs of one or more vital-sign monitoring devices, and retrieve and connect to devices that meet the instruction parameters, and by the service terminal device, perform operations of control measurement, state inquiring, configuration modification and equipment maintenance; the acquired operation result is saved into a corresponding database according to the data type; and a record of the device remote operation is saved into the business-information database.

Exemplarily, consultation-service unit is configured to, by the cloud platform, receive the consultation initiating instruction, resolve the instruction, authenticate user information and a validity state of user privilege that are carried by the instruction, and send a response message carrying license information to the service terminal device, and simultaneously, according to patient information and consultation-party information carried by the instruction, send a notification of starting a terminal-device consultation to a consultation party, establish a data link between an initiating party and the consultation party, map the service serial number according to the patient information, share patient data, and perform multi-media video-and-data consultation; file data of the consultation information are saved into the file database; a record of the consultation operation is saved into the business-information database; and the patient data include: vital-sign data, clinical information, a data-analysis-report file, an image-video file, and a medical-document file.

Exemplarily, the medical-cooperation-information issuing unit is configured to, by the cloud platform, receive the medical-cooperation-information issuing instruction, resolve the instruction, authenticate user information and a validity state of user privilege that are carried by the instruction, and send a response message carrying license information to the service terminal device, and simultaneously, according to patient information and information of a medical cooperation team that are carried by the instruction, issue cooperation information via the cloud platform to a terminal device of the medical cooperation team, and prompt by using acousto-optic effect, vibration or image-text; and a record of the medical-cooperation-information issuing operation is saved into the business-information database.

In order to meet the usage habits of different users, by using the user-self-defined-term setting unit, the user can, according to the illness of the patient, set the thresholds of abnormity in a personalized manner, and set the rule configuration of system and service, the mode and range of message notification, the options of items of third-party businesses, and the user operation interface, which improves the working efficiency of the user, and can also save the record of the setting operation, which guarantees the safety of the cloud platform and the user system.

In order to facilitate the user to quickly inquire and use information on commonly used medicines, apparatuses and consumable items and medical knowledge, the medical-tool-library-service unit of the cloud platform provides a medical-tool support service to the user. The medical-tool library comprises an ICU-commonly-used-medicine managing sublibrary (containing pharmacology, dosage, incompatibility, period of validity and warehouse entry time), a clinical-medicine-tool sublibrary (containing clinical-medicine dictionaries, clinical diagnosis-treatment manuals, nursing manuals and scientific literatures), and an ICU-equipment managing sublibrary (containing archives of management of apparatuses and consumable items, manuals for quick operation of defibrillators, manuals for quick operation of ventilators, and manuals for quick operation of vital-sign monitoring devices). The service terminal device may send a medical-tool-library inquiring instruction to the cloud platform, to in real time and on line quickly inquire and use the medical-tool library.

Exemplarily, the medical-tool-library-service unit is configured to, by the cloud platform, receive the medical-tool-library inquiring instruction, resolve the instruction, authenticate user information and a validity state of user privilege that are carried by the instruction, send a response message carrying license information to the service terminal device, according to a type of inquired data carried by the instruction, invoke associated information in a medical-tool library, and provide to the service terminal device for browsing and reading; and a record of the medical-tool-library inquiring operation is saved into the business-information database.

Figure 2:
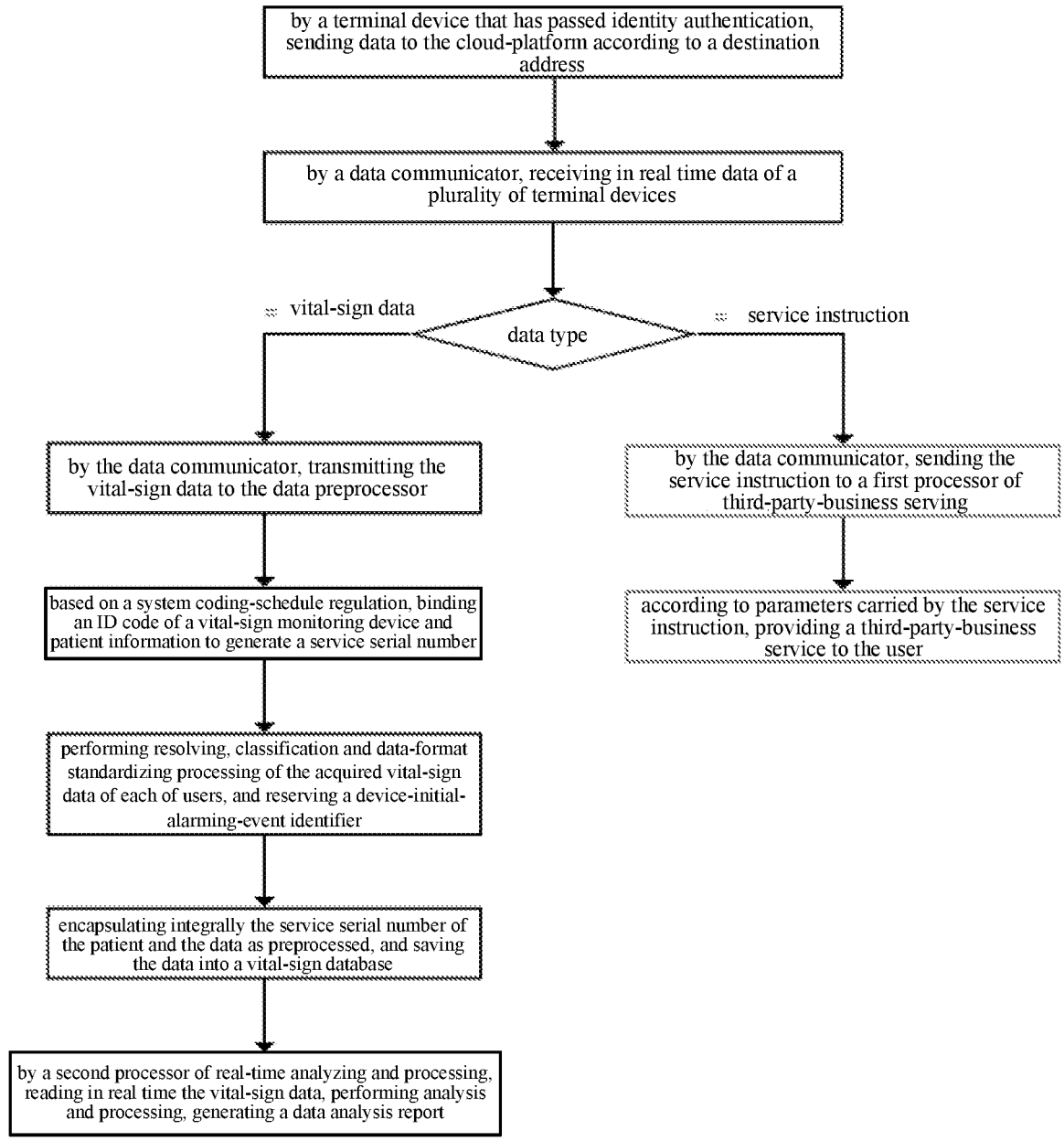
FIG. 2 is a flow chart of the method for sharing data on a medical cloud platform based on third-party business according to a second embodiment of the present application.

A second embodiment of the present application discloses a method for sharing data on a medical cloud platform based on third-party business. As shown in FIG. 2, the method comprises the steps of:

Step S201, by a terminal device that has passed identity authentication, sending data to the cloud-platform according to a destination address;

Step S202, by a data communication unit, receiving in real time data of a plurality of terminal devices, sending the service instruction in the data to a third-party-business service unit, and transmitting the vital-sign data to the data preprocessing unit;

Step S203, by the data preprocessing unit, based on a system coding-schedule regulation, binding an ID code of a vital-sign monitoring device and patient information to generate a service serial number;

Step S204, performing resolving, classification and data-format standardizing processing of the acquired vital-sign data of each of users, and reserving a device-initial-alarming-event sign;

Step S205, encapsulating integrally the service serial number of the patient and the data as preprocessed, and saving the encapsulated data into a vital-sign database;

Step S206, by a real-time analysis and processing unit, reading in real time the vital-sign data, performing analysis and processing, and generating a data analysis report; and Step S207, by the third-party-business service unit, receiving the service instruction, and according to parameters carried by the service instruction, providing a third-party-business service to the user.

As compared with some implementations, the method, by analyzing and processing in real time a massive quantity of vital-sign data, satisfies the demands of the user; by supporting the multiple communication protocols and by using the data-format standardizing processing, solves the problems of the access of external devices and systems and of non-uniform data formats, and reduces the difficulty in the concentrated and high-efficiency processing of data; by mapping the service serial number and the device ID, satisfies the requirements on the internal data inquiring of the system and the interaction with external data, and also solves the problem of identifying different patients in the same device (the same hospital bed); and by using the third-party-business service, to migrate the complicated and onerous business work of the user to the cloud platform for automatic processing, reduces the labor intensity of the medical care personnel, and improves the quality of medical care and the working efficiency.

Figure 4:
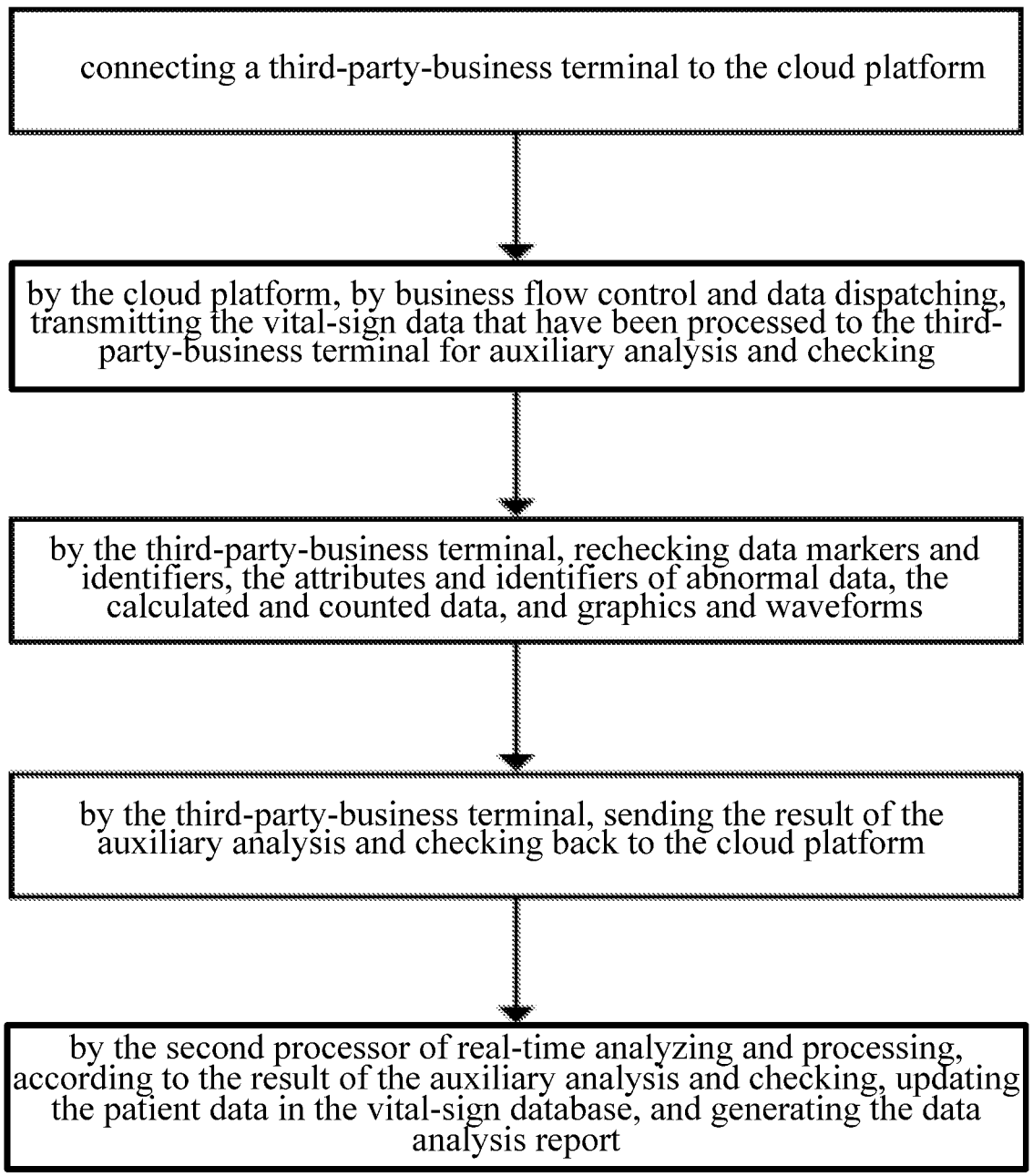
FIG. 4 is a flow chart of the auxiliary analysis and checking by a third party according to a second embodiment of the present application.

In order to further improve the quality of the data analysis service of the cloud platform, particularly, as shown in FIG. 4, the method further comprises the steps of:

Step S401, connecting a third-party-business terminal to the cloud platform, and by the cloud platform, by business flow control and data dispatching, transmitting the vital-sign data that have been processed to the third-party-business terminal for auxiliary analysis and checking;

Step S402, by the third-party-business terminal, rechecking data markers and identifiers, the attributes and identifiers of abnormal data, the calculated and counted data, and graphics and waveforms;

Step S403, by the third-party-business terminal, sending the result of the auxiliary analysis and checking back to the cloud platform; and Step S404, by the real-time analysis and processing unit, according to the result of the auxiliary analysis and checking, updating the patient data in the vital-sign database, and generating the data analysis report.

The process of the auxiliary analysis and processing by a third party does not only improve the accuracy and the fault tolerance of the data real-time processing and analysis of the cloud platform, but also, as the sample parameters of training of machine learning of the cloud platform, further improves the accuracy of the center model, and improves the working efficiency of the processing of the massive quantity of data.

In order to satisfy the real-time analysis and processing and abnormal-data screening of the massive quantity of vital-sign data, as shown in FIG. 3, the method further comprises the steps of:

by using the deep-learning framework of the Spark distributed parallel computation, reading the vital-sign data in the vital-sign database and the contained device-initial-alarming-event data;

wherein the Spark engine is configured to, according to a preset micro-batching time interval, create in parallel a plurality of tasks, and trigger a Spark Streaming to split the data by types into RDD data collections, and simultaneously control a center model of a corresponding type to analyze and screen the type of data;

by the center model, comprising a built-in second-order-difference calculating tool and/or logic analyzing tool, calculating and analyzing in real time the patterns, rhythms, speeds and numerical values of the vital-sign data, classifying and marking the waveforms, counting and summarizing the numerical values, and screening abnormal data that exceed a reference; and by the center model, when abnormal data that exceed a preset reference are found by the analysis and processing, analyzing features of the abnormal data, calculating a duration of an abnormal event, marking an attribute of the abnormal data, generating a real-time-data analysis report, and saving into a file database.

Optionally, the method integrates the vital-sign data of a whole process that have been analyzed and screened, outputs the vital-sign data, generates a dynamic-data analysis report, and saves the dynamic-data analysis report into a file database.

In order to improve the efficiency and accuracy of the analyzing and screening of the center model, the method further comprises, by using the quantitative and qualitative vital-sign data in the vital-sign database, training and optimizing in real time a center model of each type, to obtain a new center model of the type of data.

The waveform-type vital-sign data that are processed by using the method include: overall cardiac activity of whole process, electrocardiogram interval, QRS time limit, ST-segment evaluation pattern, QT interval, total respiration number of whole process, respiratory-wave interval, peak and trough values of pulse volume, peak and trough values of intracranial pressure, peak and trough values of partial pressure of end-tidal carbon dioxide and wave interval of partial pressure of end-tidal carbon dioxide; and the numerical-value-type vital-sign data include: systolic pressure and diastolic pressure in non-invasive/invasive blood pressure, pulse rate, oxyhemoglobin saturation, body temperature and fetal heart rate of whole process; stroke volume, cardiac index and total value of peripheral resistance of non-invasive heart stroke; and value of airway pressure, value of airway flow rate and value of airway volume of respiratory mechanics.

The features of abnormal data that are analyzed by using the method include: tachycardia, bradycardia, flutter-fibrillation, frequent premature beat, cardiac arrest, RonT, QT interval extension, ST-segment rising/descending, apnea, bradypnea, tachypnoea, rising/descending of oxyhemoglobin saturation, rising/descending of systolic pressure and diastolic pressure, rising/descending of mean arterial pressure, rising/descending of peak value of pulse volume, rising/descending of peak value of intracranial pressure, rising/descending of peak value of partial pressure of end-tidal carbon dioxide, rising/descending of fetal heart rate, descending of non-invasive heart stroke, and rising/descending of values of respiratory mechanics.

The contents of the dynamic-data analysis report that is generated by using the method include: for the whole process, comprehensive analysis and calculation, classification and marking of waveforms and oscillograms of data of dynamic electrocardiogram, data of dynamic blood pressure, data of respiration, data of oxyhemoglobin saturation, data of invasive blood pressure, data of intracranial pressure, data of partial pressure of end-tidal carbon dioxide, data of body temperature, data of non-invasive heart stroke, and data of respiratory mechanics, and their tendency charts, histograms, scatter plots, and diagrams of variability analysis.

The contents of the real-time-data analysis report that is generated by using the method include: real-time analysis and calculation, classification and marking of waveforms, and abnormal oscillograms of data of abnormal electrocardiogram, data of abnormal blood pressure, data of abnormal respiration, data of abnormal oxyhemoglobin saturation, data of abnormal intracranial pressure, data of abnormal partial pressure of end-tidal carbon dioxide, data of abnormal body temperature, data of abnormal fetal heart rate, data of abnormal non-invasive heart stroke, and data of abnormal respiratory mechanics, and their tendency charts.

The cloud platform saves the above data analysis reports into the file database, and the user may send a data invoking instruction to the cloud platform, to perform retrieving, inquiring, statistical analysis, reviewing and summarizing.

Figure 5:
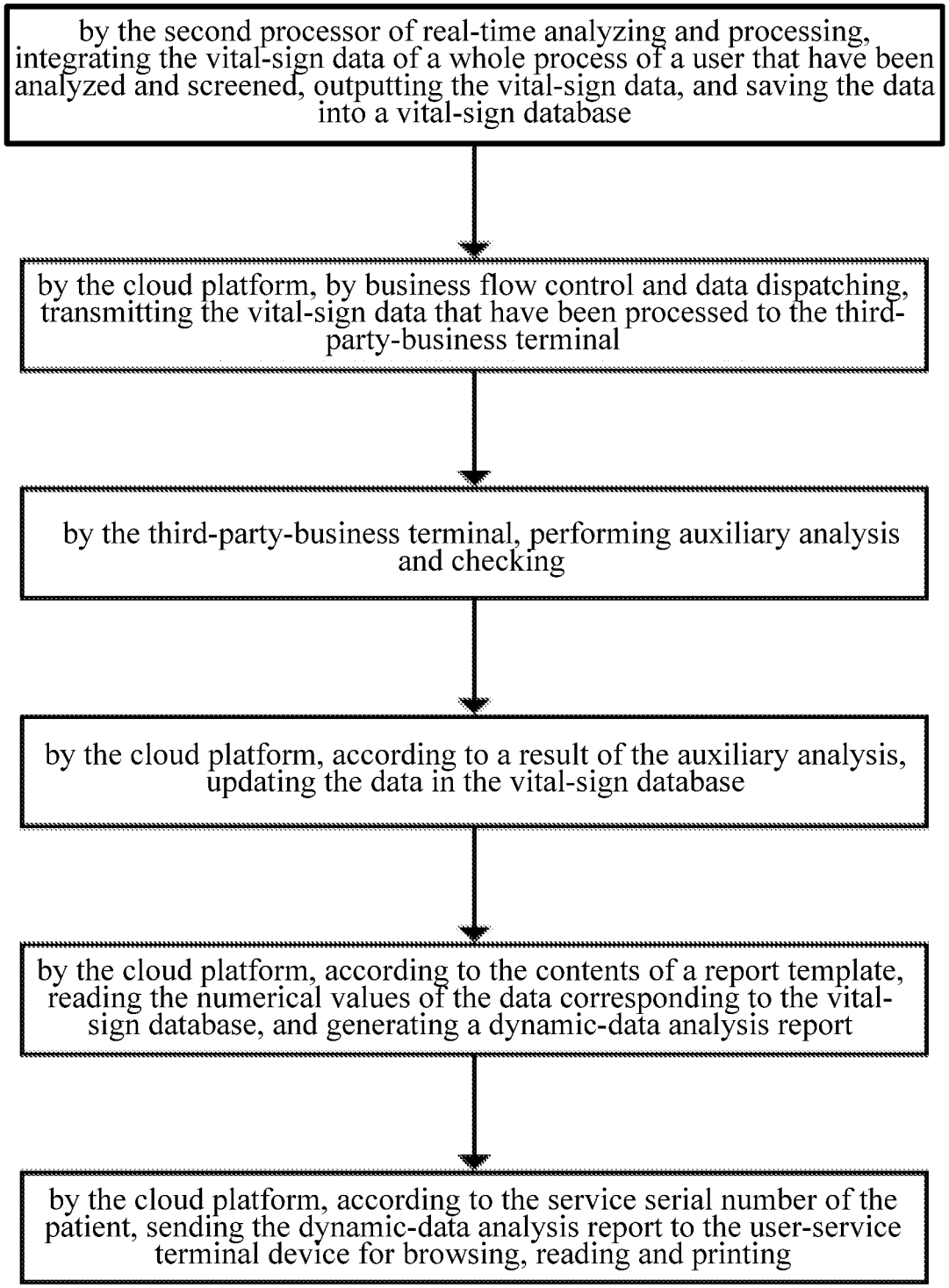
FIG. 5 is a flow chart of the generation of the dynamic-data analysis report according to a second embodiment of the present application.

In order to facilitate the user to evaluate the variation of the illness of the patient, and summarize the clinical medical effects, and also in order to facilitate the user to browse and read, save the diagnosis and treatment durations, and alleviate the working load of the medical care personnel, when the length of the routine data that are analyzed and processed by the cloud platform is greater than a preset data length, a process of dynamic-data analysis report is triggered. As shown in FIG. 5, the method particularly comprises the steps of:

Step S501, by the cloud platform, by using the real-time analysis and processing unit, integrating the vital-sign data of a whole process of a user that have been analyzed and screened, outputting the vital-sign data, and saving the data into a vital-sign database;

Step S502, by the cloud platform, by business flow control and data dispatching, transmitting the vital-sign data that have been processed to the third-party-business terminal for auxiliary analysis and checking;

Step S503, by the cloud platform, according to a result of the auxiliary analysis, updating the data in the vital-sign database;

Step S504, by the cloud platform, according to the contents of a report template, reading the numerical values of the data corresponding to the vital-sign database, and generating a dynamic-data analysis report; and Step S505, by the cloud platform, according to the service serial number of the patient, sending the dynamic-data analysis report to the user-service terminal device for browsing, reading and printing.

Further, the service terminal device inputs the service-instruction parameters, logs in on the cloud platform, sends the service instruction, obtains the response from the cloud platform, and provides the third-party-business service. The third-party-business service includes: a real-time-data service, a data invoking service, a medical-document managing service, a consultation service, a patient-state evaluating service, a device-remote-operation service, a medical-cooperation-information issuing service, a user-self-defined-term setting service, a data-analysis-report managing service and a medical-tool-library managing service.

Figure 6:
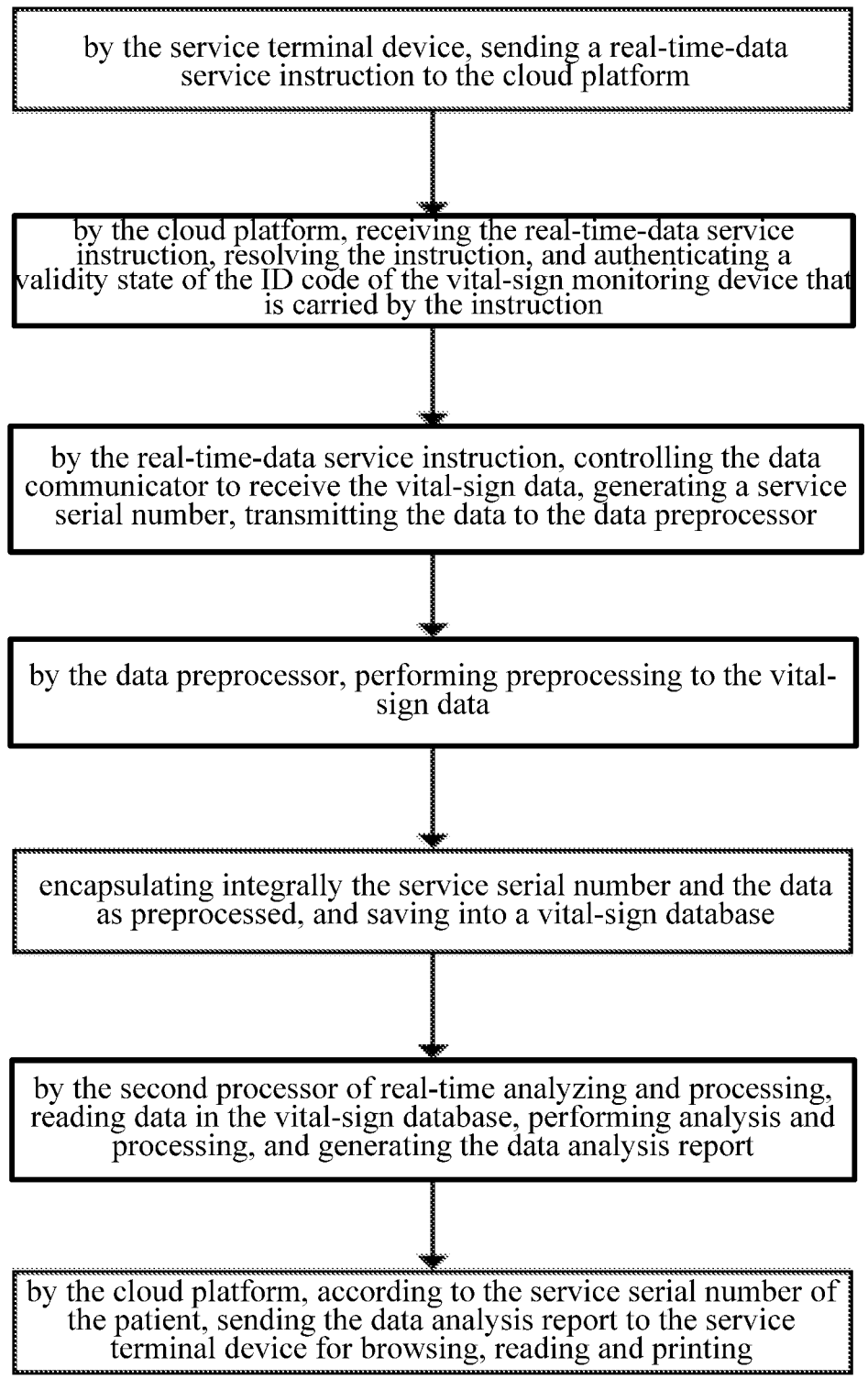
FIG. 6 is a flow chart of the real-time-data service according to a second embodiment of the present application.

Exemplarily, in order to solve the problem of the difficulty in the analysis and interpretation of the vital-sign data of the user, a real-time-data service is provided to the user. As shown in FIG. 6, the method comprises the steps of:

Step S601, by the service terminal device, sending a real-time-data service instruction to the cloud platform;

Step S602, by the cloud platform, receiving the real-time-data service instruction, resolving the instruction, and authenticating a validity state of the ID code of the vital-sign monitoring device that is carried by the instruction;

Step S603, by the instruction, controlling the data communication unit to receive the vital-sign data, transmitting the vital-sign data to the data preprocessing unit to preprocess, generating a service serial number, encapsulating integrally with the data as preprocessed, and saving the encapsulated data into a vital-sign database;

Step S604, by the real-time analysis and processing unit, reading data in the vital-sign database, performing analysis and processing, and generating the data analysis report; and Step S605, by the cloud platform, according to the service serial number of the patient, sending the data analysis report to the service terminal device for browsing, reading and printing.

Figure 7:
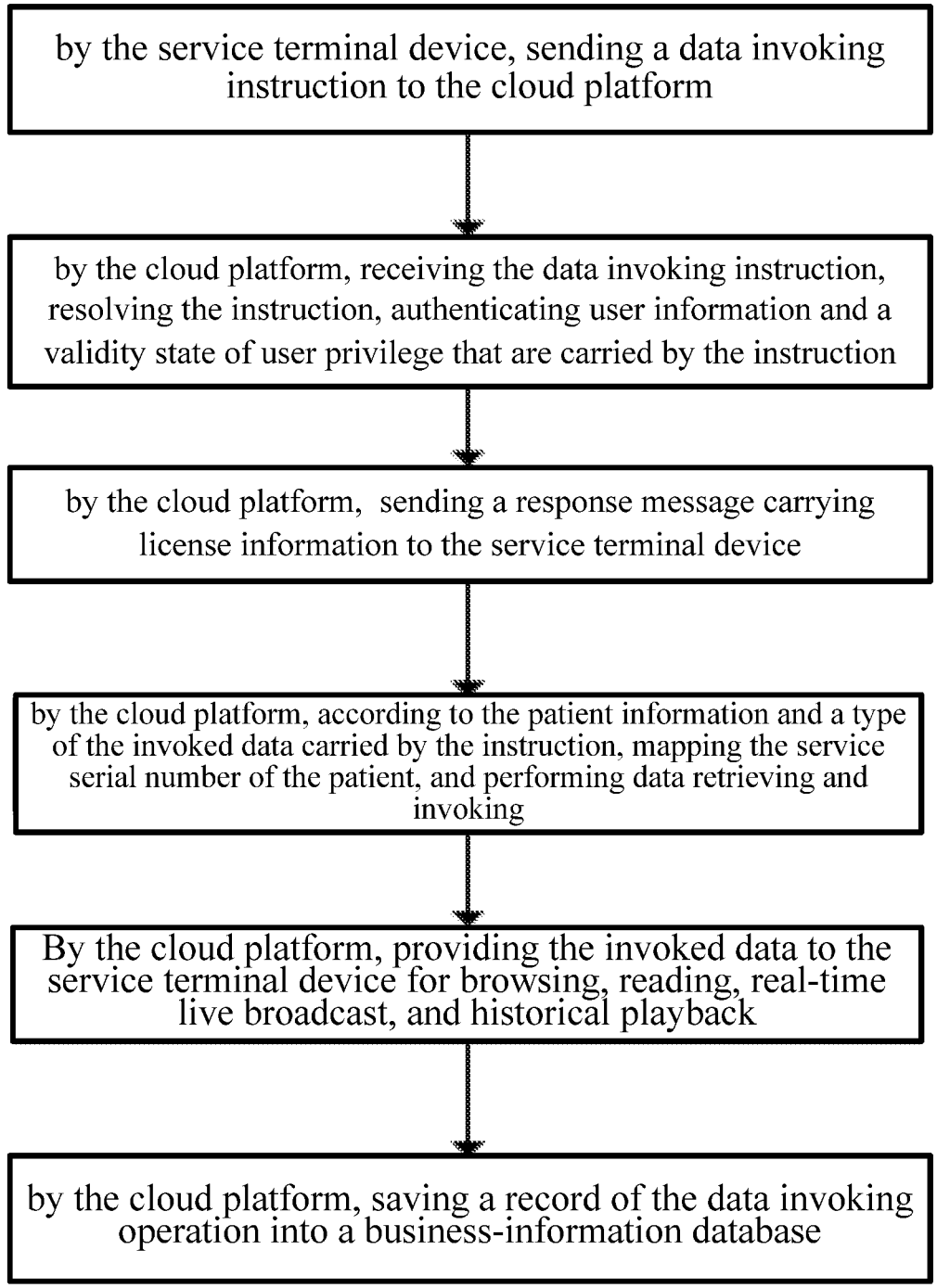
FIG. 7 is a flow chart of the data invoking service according to a second embodiment of the present application.

Exemplarily, in order to facilitate the user to acquire and read the real-time data and the historical data at any time, a data invoking service is provided. As shown in FIG. 7, the method comprises the steps of:

Step S701, by the service terminal device, sending a data invoking instruction to the cloud platform;

Step S702, by the cloud platform, receiving the data invoking instruction, resolving the instruction, authenticating user information and a validity state of user privilege that are carried by the instruction, and sending a response message carrying license information to the service terminal device;

Step S703, by the cloud platform, according to the patient information and a type of the invoked data carried by the instruction, mapping the service serial number of the patient, and performing data retrieving and invoking;

Step S704, by the cloud platform, providing the invoked data to the service terminal device for browsing, reading, real-time live broadcast, and historical playback; and Step S705, by the cloud platform, saving a record of the data invoking operation into a business-information database; wherein the invoked data include: real-time/historical vital-sign data, a data-analysis-report file, an image-video file, a multi-media video file and a medical-document file.

Figure 8:
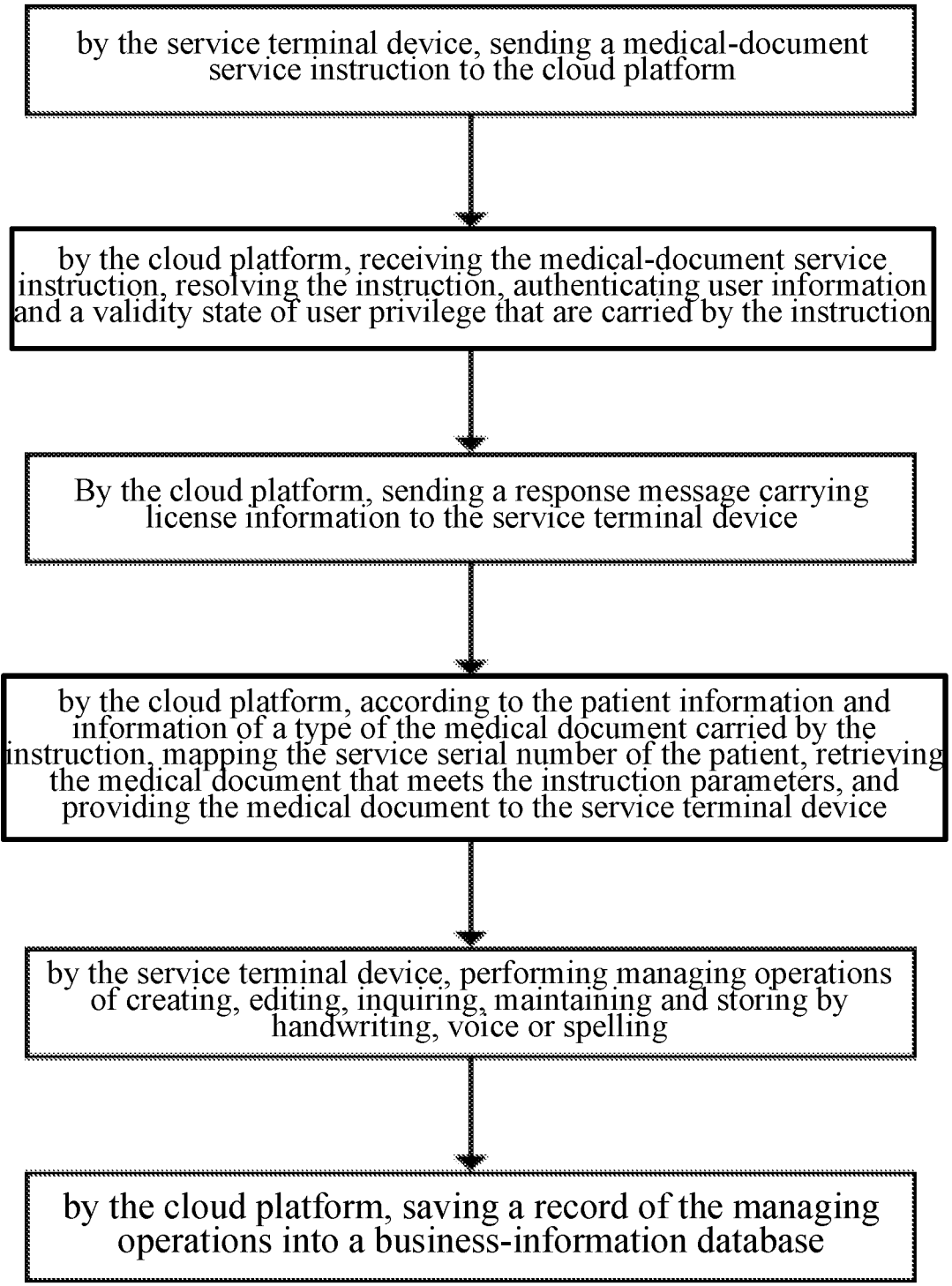
FIG. 8 is a flow chart of the medical-document managing service according to a second embodiment of the present application.

Exemplarily, in order to support the electronization of medical documents of the user, and reduce the labor intensity and the working pressure of the medical care personnel, a medical-document managing service is provided. As shown in FIG. 8, the method comprises the steps of:

Step S801, by the service terminal device, sending a medical-document service instruction to the cloud platform;

Step S802, by the cloud platform, receiving the medical-document service instruction, resolving the instruction, authenticating user information and a validity state of user privilege that are carried by the instruction, and sending a response message carrying license information to the service terminal device;

Step S803, by the cloud platform, according to the patient information and information of a type of the medical document carried by the instruction, mapping the service serial number of the patient, retrieving the medical document that meets the instruction parameters, and providing the medical document to the service terminal device;

Step S804, by the service terminal device, performing managing operations of creating, editing, inquiring, maintaining and storing by handwriting, voice or spelling; and Step S805, by the cloud platform, saving a record of the managing operations into a business-information database; wherein the information of the types of the medical document includes: a long-term medical advice, a temporary medical advice, a nursing form and an electronic case history.

Figure 9:
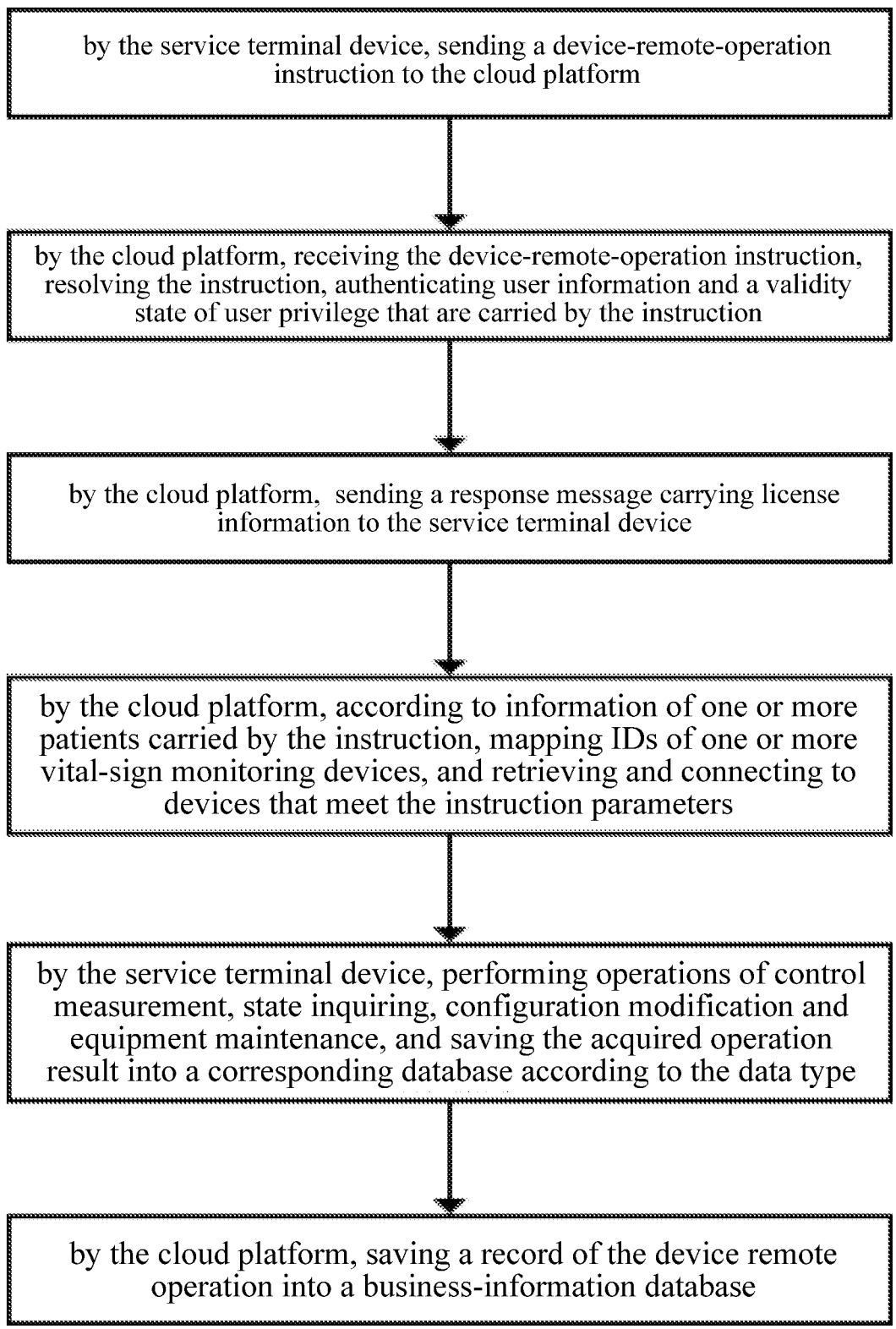
FIG. 9 is a flow chart of the device-remote-operation service according to a second embodiment of the present application.

Exemplarily, in order to support various application scenes of the user, a device-remote-operation service is provided. As shown in FIG. 9, the method comprises the steps of:

Step S901, by the service terminal device, sending a device-remote-operation instruction to the cloud platform;

Step S902, by the cloud platform, receiving the device-remote-operation instruction, resolving the instruction, authenticating user information and a validity state of user privilege that are carried by the instruction, and sending a response message carrying license information to the service terminal device;

Step S903, by the cloud platform, according to information of one or more patients carried by the instruction, mapping IDs of one or more vital-sign monitoring devices, and retrieving and connecting to devices that meet the instruction parameters;

Step S904, by the service terminal device, performing operations of control measurement, state inquiring, configuration modification and equipment maintenance, and saving the acquired operation result into a corresponding database according to the data type; and Step S905, by the cloud platform, saving a record of the device remote operation into a business-information database.

Figure 10:
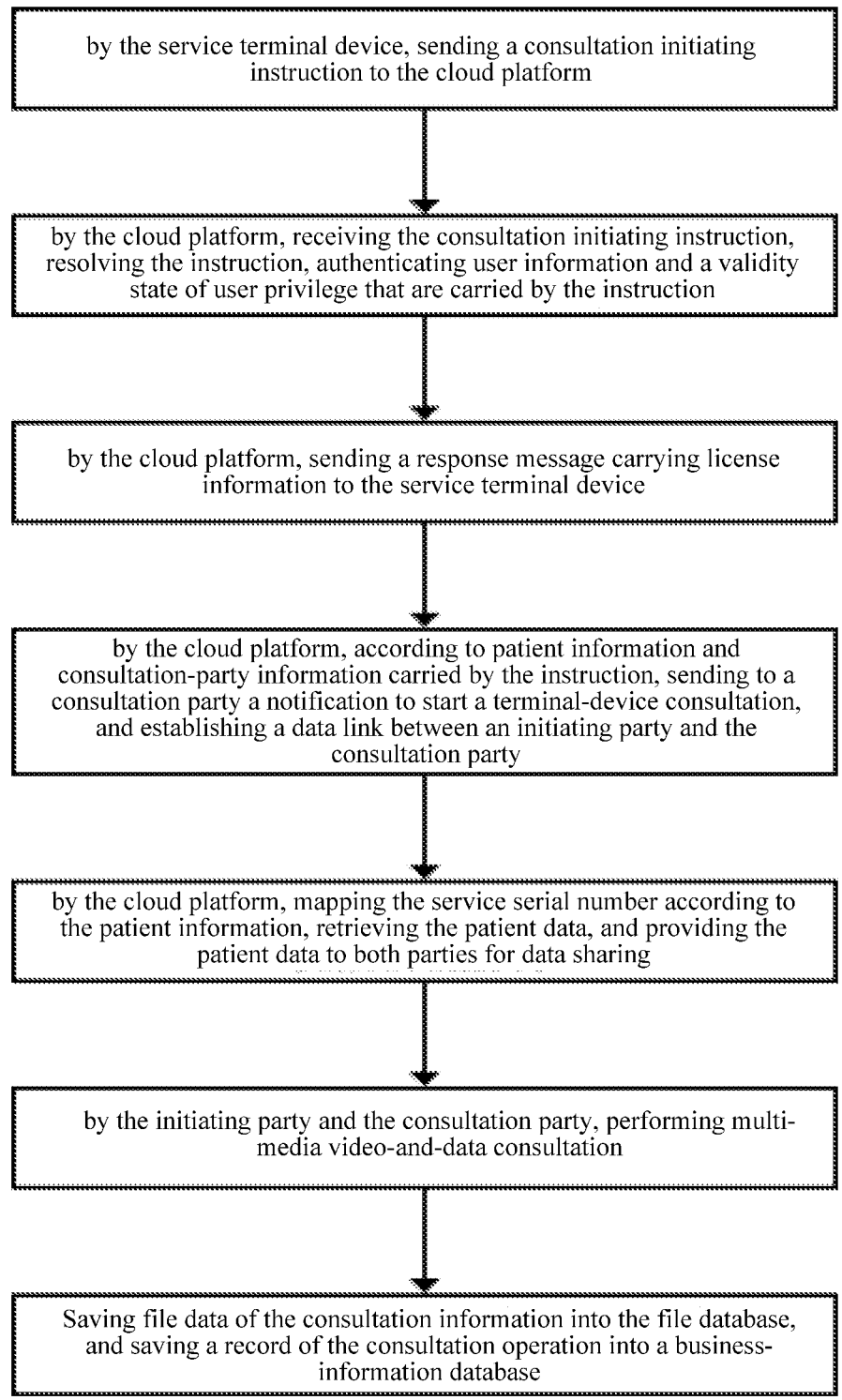
FIG. 10 is a flow chart of the consultation service according to a second embodiment of the present application.

Exemplarily, in order to sufficiently use high-quantity medical resources and improve the quality of medical service, a data-sharing consultation service between users is provided. As shown in FIG. 10, the method comprises the steps of:

Step S1001, by the service terminal device, sending a consultation initiating instruction to the cloud platform;

Step S1002, by the cloud platform, receiving the consultation initiating instruction, resolving the instruction, authenticating user information and a validity state of user privilege that are carried by the instruction, and sending a response message carrying license information to the service terminal device;

Step S1003, by the cloud platform, according to patient information and consultation-party information carried by the instruction, sending a notification of starting a terminal-device consultation to a consultation party, and establishing a data link between an initiating party and the consultation party;

Step S1004, by the cloud platform, mapping the service serial number according to the patient information, retrieving the patient data, and providing the patient data to both parties for data sharing;

Step S1005, by the initiating party and the consultation party, performing multi-media video-and-data consultation; and Step S1006, saving file data of the consultation information into the file database, and saving a record of the consultation operation into a business-information database; wherein the data include: vital-sign data, clinical information, data of a data-analysis-report file, data of an image-video file, and data of a medical-document file.

Figure 11:
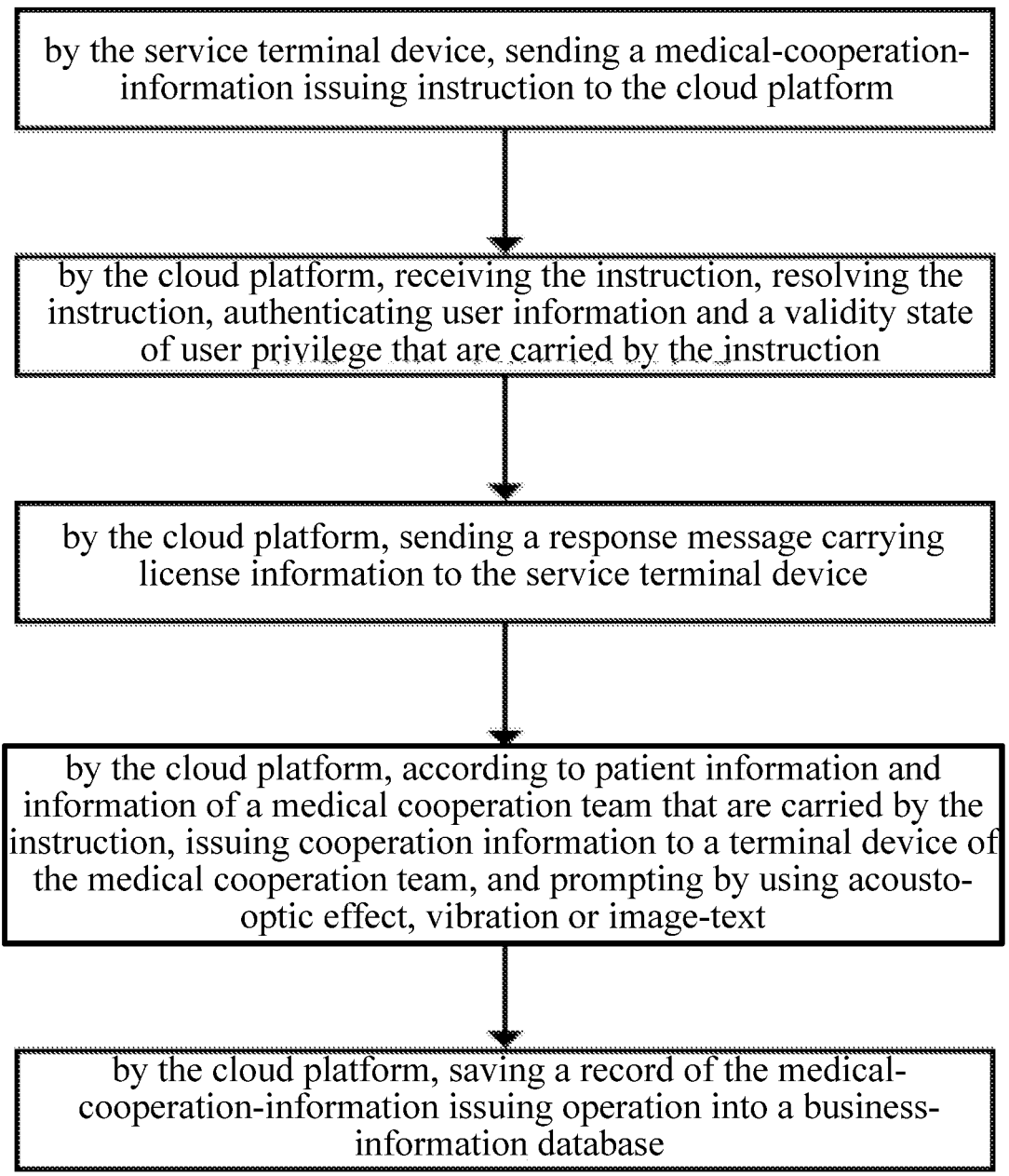
FIG. 11 is a flow chart of the medical-cooperation-information issuing service according to a second embodiment of the present application.

Exemplarily, in order to support the user to quickly concentrate medical resources to serve patients of emergency treatment and high-risk intractable patients, a medical-cooperation-information issuing service is provided. As shown in FIG. 11, the method comprises the steps of:

Step S1101, by the service terminal device, sending a medical-cooperation-information issuing instruction to the cloud platform;

Step S1102, by the cloud platform, receiving the instruction, resolving the instruction, authenticating user information and a validity state of user privilege that are carried by the instruction, and sending a response message carrying license information to the service terminal device;

Step S1103, by the cloud platform, according to patient information and information of a medical cooperation team that are carried by the instruction, issuing cooperation information to a terminal device of the medical cooperation team, and prompting by using acousto-optic effect, vibration or image-text; and Step S1104, by the cloud platform, saving a record of the medical-cooperation-information issuing operation into a business-information database.

In order to meet the usage habits of different users, the users, by using the user-self-defined-term setting units of the cloud platform, according to the illness of the patient, may set the thresholds of abnormity in a personalized manner, and set the rule configuration of system and service, the mode and range of message notification, the options of items of third-party businesses, and the user operation interface, which improves the working efficiency of the user, and may also save the record of the setting operation, which guarantees the safety of the cloud platform and the user system.

In order to facilitate the user to quickly inquire and use information on commonly used medicines, apparatuses and consumable items and medical knowledge, the medical-tool-library-service unit of the cloud platform provides a medical-knowledge-library service to the user. The medical-tool library comprises an ICU-commonly-used-medicine managing sublibrary (containing pharmacology, dosage, incompatibility, period of validity and warehouse entry time), a clinical-medicine-tool sublibrary (containing clinical-medicine dictionaries, clinical diagnosis-treatment manuals, nursing manuals and scientific literatures), and an ICU-equipment managing sublibrary (containing archives of management of apparatuses and consumable items, manuals for quick operation of defibrillators, manuals for quick operation of ventilators, and manuals for quick operation of vital-sign monitoring devices). The service terminal device may send a service instruction to the cloud platform, to in real time and on line quickly inquire and use the medical-tool library.

The present disclosure, by using the functions of the cloud platform of managing the service objects and attributes, and managing the relation between the roles of the service objects, determines the natures, levels and roles of users in the business operation, establishes a close relation of upper and lower levels between large-scale hospitals and small and medium-scale hospitals, and realizes on the cloud platform the sharing of medical data and medical resources, the consultation of high-risk intractable cases, and remote teaching and ward inspection, which improves the medical proficiency of the small and medium-scale hospitals. By using the data-analysis-report managing service of the cloud platform, the user can, by using the terminal device, quickly and conveniently retrieve and use the data analysis report, as the clinical medical basis for evaluating medical effects. By the data analyzing and counting service, the cloud platform provides to the user a universal medical statistical tool, whereby various business data can be analyzed and counted, and the result can be provided to the terminal device of the user for browsing and reading. By the patient-state evaluating service, the cloud platform provides to the user a universal severe-illness evaluation system model, by automatically gathering the vital-sign data and the relative indexes of the patient in the database, and evaluating and predicting the disease state and the developing trend of the patient, which supports the digitalization of the routine work of the user, reduces the working pressure of the user, and improves the quality of medical care.

It should be noted that the system and method for sharing data on a medical cloud platform based on third-party business of the present application may be deployed, implemented and operated in a public cloud or a private cloud, and may be implemented by using a server, a database or an application service system at the cloud side.

Figure 12:
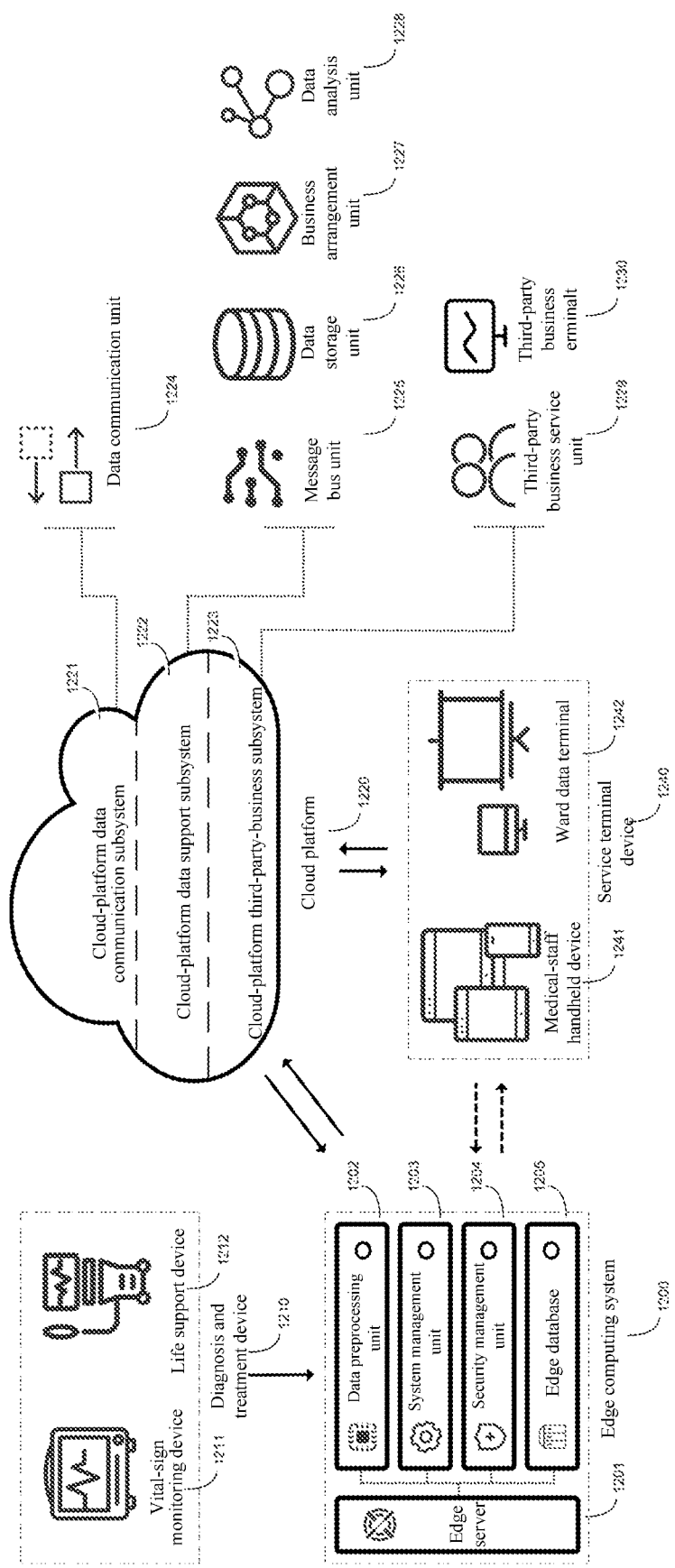
FIG. 12 is a schematic diagram of a cloud-edge collaborative processing system for ICU data based on third-party business according to a third embodiment of the present application.

Refer to FIG. 12, a third embodiment of the present application discloses a cloud-edge collaborative processing system for ICU data based on third-party business, including an ICU diagnosis and treatment device 1210, an edge computing system 1200, a service terminal device 1240, and a cloud platform 1220.

The ICU diagnosis and treatment device 1210 includes a plurality of vital-sign monitoring devices 1211 and a plurality of life support devices 1212, and is connected to the edge computing system 1200. The edge computing system 1200 is connected to the cloud platform for data interaction.

Specifically, the vital-sign monitoring device 1211 includes devices such as multi-parameter monitors, hemodynamic monitors, blood gas analyzers, intracranial pressure monitors, electroencephalography monitors, urodynamic monitors, and fetal heart monitors; and the life support device 1212 includes devices such as ventilators, continuous renal replacement therapies (CRRT), infusion pumps, intra-aortic balloon pumps (IABP), and extracorporeal membrane oxygenation systems (ECMO).

The edge computing system 1200 is configured to acquire multi-source heterogeneous medical data output by the ICU diagnosis and treatment device 1210, preprocess the medical data through resolving, classification, and data-format standardization to generate medical data in a standard format, and store the medical data in an edge database 1205. In addition, the edge computing system 1200 is connected to hospital internal information systems of users to perform data interaction and obtain user information, patient information, and clinical information.

The edge computing system 1200 includes an edge server 1201, and the edge server 1201 includes a system management unit 1203, a data preprocessing unit 1202, a security management unit 1204, and the edge database 1205.

Specifically, the system management unit 1203 is configured to manage the ICU diagnosis and treatment device 1210 accessed by the edge computing system 1200 and running statuses of the edge computing system 1200 and report to the cloud platform 1220; receive data and control instructions from the cloud platform 1220; execute various business tasks including updating programs, configuration files, and data in the edge database; maintain business collaboration between the cloud platform and the edge computing system; manage the accessed hospital internal information systems; take over operation of a data service in the event of a network outage of the cloud platform-edge computing system. In addition, the system management unit 1203 controls the edge computing system 1200 to directly connected to the service terminal device 1240 when the network failure of the cloud platform-edge computing system triggers callings of function calculation, to establish a new data path; reads the medical data in the edge database to perform analysis and processing; performs a live broadcast on the service terminal device 1240 for visual display; and maintains continuous running of the data service; and after data communication of the network is restored, encrypts medical data during the failure event and upload encrypted data to the cloud platform 1220 for further processing.

Compared with some implementations, in the cloud-edge collaborative processing system for ICU data based on third-party business provided by this embodiment, the edge computing system is immediately triggered to take over medical data business when the network of the cloud platform-edge computing system fails, thus ensuring the security of system running and the continuity of the medical data business, solving the problem of paralysis of the medical data business caused by the network failure in the existing centralized cloud platform architecture, and having wide applicability.

Specifically, the data preprocessing unit 1202 is configured to acquire multi-source heterogeneous data of the ICU diagnosis and treatment device; generate medical data in a standard format through preprocessing; reserve device-initial-alarming-event sign (or signs); bind ID codes of ICU diagnosis and treatment devices therein and patient information to generate service serial numbers; encapsulate integrally the service serial numbers and the preprocessed medical data and store encapsulated data into the edge database 1205; and synchronously encrypt the encapsulated data and transmit encrypted data to the cloud platform 1220, where one of the service serial numbers includes a timestamp, the user information, the patient information, the clinical information, device information, and a quantity counter.

The data preprocessing unit 1202 is embedded with a plurality of communication protocols including: a TCP/IP protocol, an instant messaging protocol, an HL7 protocol, a DICOM protocol, a multi-media communication protocol, and an equipment manufacturer communication protocol, where the plurality of communication protocols can be used to adapt to data communication interfaces of ICU diagnosis and treatment devices from different manufacturers and the hospital internal information systems. The data preprocessing unit 1202 is further embedded with a symmetric encryption algorithm protocol, which is used for communication of encrypted data with the cloud platform, so as to ensure the security of data communication with the cloud platform for guaranteeing the data safe. The algorithm protocol may be one of DES, AES or Blowfish.

The security management unit 1204 is configured to authenticate identities of a device and an external system, permit access to the edge computing system 1200, monitor a running status of the device and network in real time, timely issue a security warning, monitor privacy information in the medical data with a self-defined rule, desensitize privacy information by using a desensitization technology when any privacy information is found, when the network of the cloud platform-edge computing system fails, trigger the system management unit to call function calculation, and maintain continuous running of the data service. The desensitization technology may be one or a combination of generalization technology, inhibition technology and disturbance technology.

The edge database 1205 is configured to store various types of data of the edge computing system 1200, and to query, invoke, and store various types of data when the system is running.

Compared with some implementations, in the cloud-edge collaborative processing system for ICU data based on third-party business provided by this embodiment, the edge computing system under the cloud-edge business collaboration architecture implements centralized management of a plurality of ICU diagnostic and treatment devices, and preprocessing of multi-source heterogeneous medical data, which reduces the complexity and amount of upstream data, shortens the network delay, reduces network bandwidth costs, greatly improves a load capacity of the cloud platform, and the computing efficiency and storage capacity of massive data, and reduces the burden on the entire cloud platform. With same cloud-platform resources, more ICU diagnosis and treatment devices can be served through cloud-edge business collaboration, which solves the bottleneck in scale existing in the centralized cloud platform business architecture. In addition, the problem of patient identification is solved through bidirectional mapping conversion between a service serial number and a device ID, which establishes reliable and efficient internal and external logical relations of data query and data interaction for the cloud-edge business collaborative architecture, which satisfies requirements for internal data query of the system and interaction with external data, further improves the running efficiency of the cloud platform, reduces running costs, and has wide applicability.

The service terminal device 1240 includes a plurality of medical-staff handheld terminals 1241 and a plurality of ward data terminals 1242, and is connected to the cloud platform 1220 to perform data interaction.

It should be noted that because the edge computing system 1200 is set in the hospital site, once the medical-staff handheld terminal leaves the site, a service cannot be obtained. The ward data terminal is a common device for medical staff, which needs the support of a lot of medical data and data analysis reports as well as the support of business service. However, a storage capacity of the edge computing system is limited. Therefore, the service terminal device 1240 is directly connected to the cloud platform 1220, so that the medical-staff handheld terminal 1241 in an active state can be connected to the cloud platform to obtain business service support in any place, and the ward data terminal 1242 can be connected to the cloud platform to obtain more data and business support.

Compared with some implementations, in the cloud-edge collaborative processing system for ICU data based on third-party business provided by this embodiment, the service terminal device under the cloud-edge business collaborative architecture directly performs data interaction with the cloud platform, which effectively improves a service response speed, flexibility and convenience, reduces a delay in an intermediate link, and reduces the running pressure and costs of the edge computing system.

The cloud platform 1220 is connected to the edge computing system (or systems) 1200 and performs data interaction. The cloud platform 1220 includes: a cloud-platform data communication subsystem 1221, a cloud-platform data support subsystem 1222, and a cloud-platform third-party-business subsystem 1223. Data includes: service instructions and medical data.

The cloud-platform data communication subsystem 1221 is configured to perform data communication and business interaction between the cloud platform and the edge computing system 1200, and between the cloud platform and the service terminal devices 1240. The cloud-platform data communication subsystem 1221 includes: a data communication unit 1224, where the data communication unit 1224 is configured to receive in real time the medical data sent by the edge computing system, and service instructions sent by the service terminal device 1240, decrypt the medical data and store decrypted data in a caching database, transfer service instructions to the cloud-platform third-party-business subsystem 1223, and select business service tasks; and the data communication unit 1224 further performs interaction of encrypted data with the edge computing system 1200 and the service terminal device 1240.

Compared with some implementations, the cloud-edge collaborative processing system for ICU data based on third-party business provided by this embodiment can greatly reduce the operating burden and cost pressure of data communication devices on the cloud platform and the network bandwidth. The symmetric encryption protocol embedded in the data communication unit is suitable for parallel computing and high throughput, and ensures the data communication security of the entire cloud-edge business collaboration architecture. The encryption protocol may be one of DES, AES, or Blowfish.

The cloud-platform data support subsystem 1222 is configured to, by applying a deep learning framework for distributed parallel computing, analyze and calculate medical data received by the cloud platform in real time, generate data analysis reports, and store data and files.

Specifically, the cloud-platform data support subsystem 1222 includes: a message bus unit 1225, a data storage unit 1226, a business arrangement unit 1227, and a data analysis unit 1228.

The message bus unit 1225 uses a message queue communication protocol, including message service and message queue interfaces, and is used to connect and control data transmission (such as business message notification and business data transmission) between subsystems and between units in the cloud platform.

The data storage unit 1226 includes a clinical database, a file database, a business information database, and a caching database for storing and invoking data and files. The clinical database uses a structured data service system, is configured to store medical data that have undergone analysis, labeling, auxiliary analysis and review, including qualitative and quantitative data that can be used for training a model, and has the ability of mass storage and high concurrent real-time query. The file database employs an object storage service system, and is configured to store various files generated by the business system, and upload the data files to the storage space in a form of object, where the files include unstructured data files such as a file of patient information, a file of clinical information, a file of a data report, a file of a medical document, a file of multi-media video, and a file of medical material. The business information database employs a database of relational-model-organization data, and is configured for the cloud platform to store structured business data, and control query and storage of data of the business logical relations between the units, which has the advantage of maintaining the data consistency. The caching database uses a non-relational database, and is configured to control data exchange between the units and state maintaining, and is further configured to store medical data uploaded by the edge computing system, and results of database query, which reduces the times of accessing the database, and increases a reading speed.

The business arrangement unit 1227 uses a cluster manager framework, and is configured to manage edge computing systems with different scales distributed in different network environments, and arrange and schedule business, so as to further improve resource utilization of the cloud-edge business collaboration architecture. Specifically, the business arrangement unit 1227 uses the cluster manager framework, and is configured to manage edge computing systems distributed in different network environments and different hardware systems and with different service scales. The business arrangement unit 1227 encapsulates the edge computing systems (that is, edge nodes) into corresponding functional units according to service functions, and drives a service combination and invoking functional unit through a function model to arrange and generate different types of edge node instances and configuration parameters. The quick integral deployment of the edge computing systems improves the operation efficiency of the cloud-edge business collaboration architecture.

The data analysis unit 1228 is configured to read data in the caching database in real time and perform real-time analysis and processing, synchronously schedule the data to the third-party-business terminal for auxiliary analysis and review, store the data into the clinical database, and encrypt and transmit the data to the edge computing system 1200. The edge computing system 1200 decrypts the encrypted data, and updates the data in the edge database 1205 according to the service serial numbers.

Compared with some implementations, in the cloud-edge collaborative processing system for ICU data based on third-party business provided by this embodiment, the running efficiency of the cloud platform data support subsystem under the cloud-edge business collaboration architecture is further improved. The message bus unit supports bus data in running at a high speed among systems and units through service decoupling, message broadcasting, and peak shifting flow control of a message queue. The data storage unit integrates advantages of various databases and data storage service systems, and meets requirements for large-scale data collection and multi-data category management by a cloud-edge business collaboration architecture. The business arrangement unit centrally manages the edge computing systems accessing the cloud platform, and performs service scheduling, which improves resource utilization of the cloud-edge business collaboration system, ensures stable operation in a high concurrency environment, and thus provides a resource environment for real-time processing of massive medical data.

The cloud-platform third-party-business subsystem 1223 is configured to provide third-party-business services according to service instructions of the service terminal device 1240, and perform auxiliary analysis and review on data stream (or streams) analyzed and processed in real time by the cloud-platform data support subsystem 1222. The cloud-platform third-party-business sub system 1223 includes: a third-party-business service unit 1229 and a third-party-business terminal 1230, where the third-party-business service unit 1229 is configured to receive the service instructions and provide third-party-business services to users, and the third-party-business terminal 1230 is connected to the cloud platform 1220 for auxiliary analysis and review of the medical data, and visual management of processes and statuses of various business services.

Compared with some implementations, in the cloud-edge collaborative processing system for ICU data based on third-party business provided by this embodiment, the third-party-business subsystem in the cloud platform provides guarantee for the quality of real-time analysis of massive data in the cloud-side business collaboration architecture, quickly responds to service instructions of the users, provides third-party-business services, visually manages processes and statuses of various business services, improve the quality of third-party services, effectively reduces the labor intensity of medical staff related to the user, and has wide applicability.

Specifically, the cloud-edge collaborative processing system for ICU data based on third-party business provided by this embodiment centrally manages various diagnosis and treatment devices in ICUs through the edge computing systems, and standardizes a format of the multi-source heterogeneous medical data during preprocessing, greatly reducing the complexity and amount of upstream data, shortening network delay, reducing network bandwidth costs, and greatly improving the load capacity of the cloud platform, and the calculation efficiency and storage capacity of massive data. When the cloud-edge network is interrupted, the edge computing system takes over the data business, ensuring the security of system running and the continuity of data business. In addition, the problem of patient identification is solved through coding and mapping relations between service serial numbers and IDs of the diagnosis and treatment devices, which provides reliable and efficient internal and external logical relations of data query and data interaction for the cloud-edge business collaborative architecture, which satisfies requirements for internal data query of the system and interaction with external data. The third-party-business services ensure the quality of real-time analysis of massive data in the cloud-edge business collaboration architecture, and service quality of various business, reduces the labor intensity of medical staff, meets clinical application requirements of ICU medical data in many hospitals, effectively solves the bottleneck and deficiency of the existing centralized cloud platform business architecture in processing ICU medical data, and has wide applicability.

Figure 13:
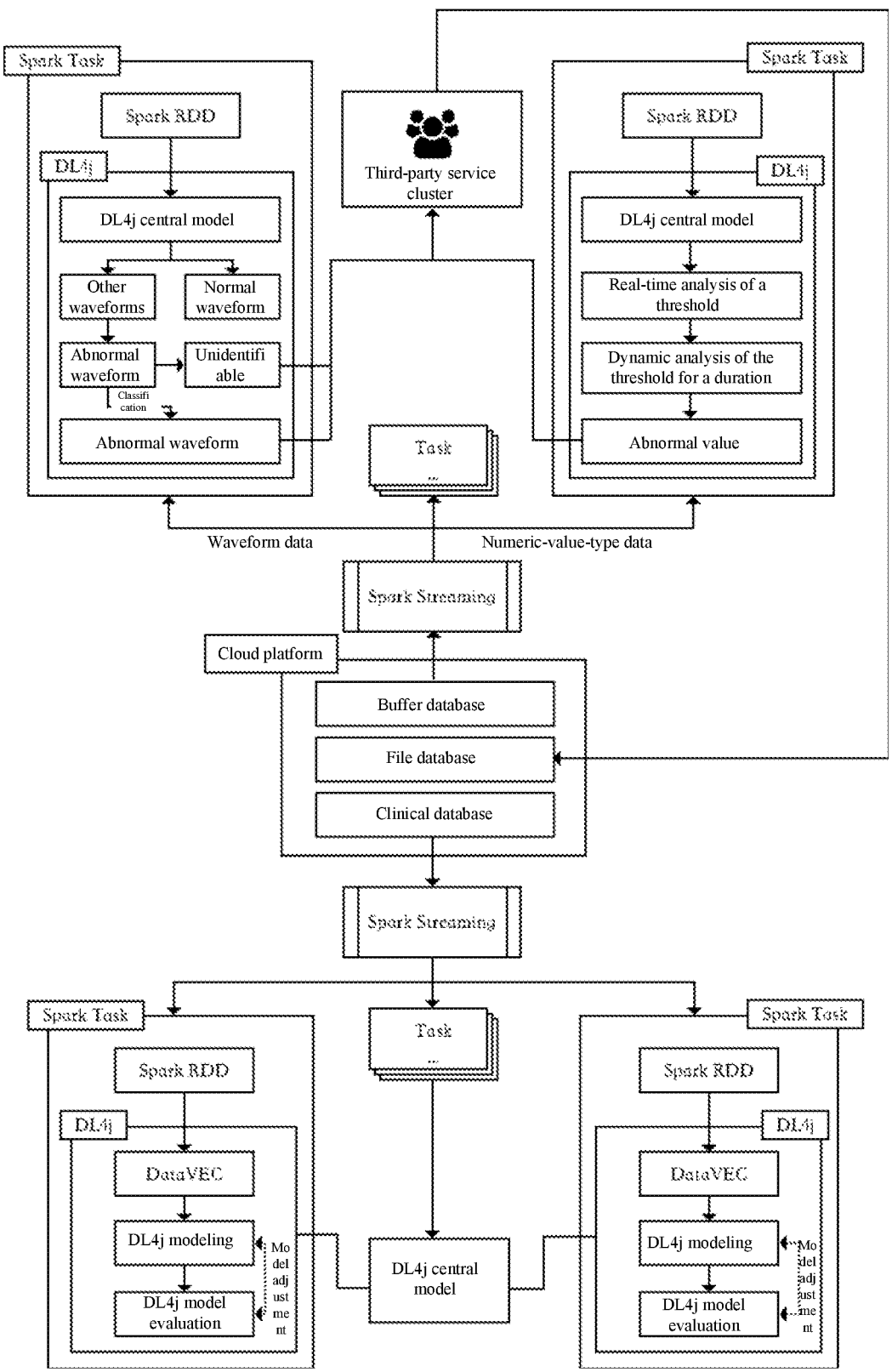
FIG. 13 is a deep learning framework based on distributed parallel computing according to a third embodiment of the present application.

The data analysis unit 1228 uses the deep learning framework based on distributed parallel computing to perform real-time analysis and screening of the medical data. Refer to FIG. 13, the data analysis unit, based on the deep machine learning framework for distributed parallel computing, reads the medical data in the caching database in real time, performs calculation and measurement, labeling, feature extracting, feature dimension vectorization processing, and real-time task scheduling by using the deep learning framework for distributed parallel computing, creates a plurality of tasks in parallel, controls a central model function of a corresponding type to identify data of the type, and when identification results exceed setting thresholds, marks attributes of the abnormal data. The third-party-business terminal 1230 synchronously performs real-time auxiliary analysis and review on measured and calculated values, marks, attributes and signs of abnormal data, statistical values of data, graphs and waveforms of data streams, where reviewed medical data including qualitative and quantitative data is stored into the clinical database for generating a data analysis report. The data analysis unit 1228 generates real-time data analysis reports based on features of the abnormal data, and attributes and durations of an abnormal events, stores the reports into the file database, sends the reports to the service terminal device 1240 at the same time, and sends abnormal-event warnings to the users. The data analysis unit 1228 integrates each patient's entire medical data, generates dynamic data analysis reports, stores the reports into the file database, and sends the reports to the service terminal device 1240 at the same time. The data analysis unit 1228 uses the qualitative and quantitative medical data to train and optimize each type of central model to obtain various types of optimized central models, and the deep learning framework for distributed parallel computing may be one of Spark, Samza, Storm, or Flink.

Compared with some implementations, in the cloud-edge collaborative processing system for ICU data based on third-party business provided by this embodiment, the cloud platform uses the deep machine learning framework based on distributed parallel computing, which has the advantages of distribution, stream processing and high throughput. In addition, the medical data stream is preprocessed by the edge computing system, which greatly reduces the amount of data, so that the cloud platform can provide real-time analysis services and data analysis reporting services for massive medical data streams collected by many edge computing systems. Third-party real-time auxiliary analysis and review further ensures the quality of processing medical data on the cloud platform, and optimizes the central model through quantitative and qualitative data, which improves the accuracy of the central model, and improves the processing efficiency and quality of the medical data and data analysis reports. By analyzing and calculating in real time the medical data, screening abnormal data, and sending a warning to the user, the solution improves the accuracy of the abnormal-event warning, and effectively reduces serious troubles caused to medical staff by frequent false alarm events of the ICU diagnosis and treatment device in clinical application, and has wide applicability.

It should be noted that the medical data analyzed and processed by the data analysis unit in this embodiment includes: waveform-type data and numerical-value-type data of the vital-sign monitoring device and the life support device (as shown in FIG. 13).

Multi-parameter data includes: waveform-type data of electrocardiogram (ECG), respiration (RR), noninvasive arterial blood pressure (NBP), invasive arterial blood pressure (IBP), photoelectric plethysmography (PPG), and partial pressure of end-tidal carbon dioxide (PetCO2), as well as numerical-value-type data of heart rate, respiratory rate, systolic pressure, diastolic pressure, mean arterial pressure, pulse oxygen saturation, perfusion index (PI), perfusion variability index (PVI), temperature, pulse rate, and partial pressure of end-tidal carbon dioxide.

Hemodynamics data includes: waveform-type data of invasive arterial blood pressure, floating catheter pulmonary artery and right atrial pressure, as well as numerical-value-type data of heart rate, systolic pressure, diastolic pressure, mean arterial pressure (MAP), central venous pressure (CVP), right atrial pressure (RAP), pulmonary arterial pressure (PAP), mean pulmonary arterial pressure (MPAP), pulmonary artery wedge pressure (PAWP), cardiac output (CO), cardiac index (CI), stroke volume (SV), peripheral vascular resistance (SVR), and pulmonary vascular resistance (PVR). Minimally invasive PICCO data includes: numerical-value-type data of cardiac index (CI), pulse continuous cardiac output (PCCO), arterial blood pressure (ABP), stroke volume (SV), central venous pressure (CVP), intrathoracic blood volume (ITBV), peripheral vascular resistance (SVR), cardiac function index (CFI), extravascular lung water (EVLW), global end-diastolic volume index (GEDI), heart rate (HR), and pulse pressure variability (PPV).

Blood gas analysis (ABG) data includes: numerical-value-type data of blood acid-base scale (PH), arterial partial pressure of carbon dioxide ($PaCO_2$), arterial partial pressure of oxygen ($PaO_2$), lactic acid (Lac), standard bicarbonate ($HCO^{3-}$), base excess (BE), potassium ($K^+$), calcium ($Ca^{2+}$).

Intracranial pressure (ICP) data includes: waveform-type data of intracranial pressure, and numerical-value-type data of intracranial pressure and cerebral perfusion pressure. Electroencephalography (EEG) data includes: waveform-type data of electroencephalography, and numerical-value-type data of bispectral index (BIS), total power (TP), suppression ratio (SR), and entropy index (Entropy).

Urine output (UO) dynamic monitoring data includes: numerical-value-type data of urine flow/hour, total urine output, and bladder pressure. The infusion pump data includes numerical-value-type data of infusion mode, infusion speed, volume to be infused, total amount of infusion, infusion pressure, and infusion time. Fetal heart rate monitoring data includes: numerical-value-type data of fetal heart rate (FHR).

Respiratory mechanics data includes: waveform-type data of pressure, volume, flow, as well as numerical-value-type data of ventilation mode, airway peak pressure (Ppeak), plateau pressure (Pplat), positive end-expiratory pressure (PEEP), compliance (CL), airway resistance (AR), peak inspiratory pressure (PIP), expiratory tidal volume (VTe), minute ventilation (MV), fractional concentration of inspired oxygen ($FiO_2$), and respiratory rate (RR).

Data of the intra-aortic balloon pump (IABP) includes: waveform-type data of electrocardiogram, counterpulsation pressure, and arterial blood pressure, as well as numerical-value-type data of counterpulsation pressure, balloon pressure, mean arterial pressure, central arterial pressure, systolic peak pressure, end-diastolic pressure.

The data of continuous renal replacement therapy (CRRT) includes: numerical-value-type data of blood flow, arterial pressure (PA), venous pressure (PV), transmembrane pressure (TMP), pre-filter pressure (PBF), ultrafiltrate lateral pressure (PF), substitution fluid flow rate, dialysate fluid flow rate, heparin pump flow rate, $Ca^{2+}$ pump flow rate, citric acid pump flow rate, $NaHCO_3$ pump flow rate, dilution concentration, ultrafiltration rate, filtration fraction and temperature, as well as numerical-value-type data of heart rate, respiratory rate, arterial blood pressure, central venous pressure (CVP) and arterial oxygen saturation ($PaO_2$) in hemodynamics.

Extracorporeal membrane oxygenation (ECMO) data includes: centrifugal pump speed (rpm), flow (L/min), $FiO_2$ (inhaled oxygen concentration), gas flow (L/min), temperature (° C.), and mean arterial pressure (MAP), mixed venous oxygen saturation ($SvO_2$), activated whole blood coagulation time (ACT).

Characteristics of multi-parameter abnormal data include: disappearance of electrocardiogram wave group and pulse wave group (cardiac arrest), disappearance of wave group of partial pressure of end-tidal carbon dioxide and respiratory wave group (asphyxia), tachycardia/bradycardia, flutter/fibrillation, frequent premature beats, RonT, QT interval extension, ST segment elevation/depression, and the increase/decrease of respiratory rate, systolic pressure and diastolic pressure, the increase/decrease of mean arterial pressure, the decrease of pulse oxygen saturation, the decrease of pulse perfusion index (PI), the increase of perfusion index variability (PVI), the increase/decrease of a peak value of partial pressure of end-tidal carbon dioxide, and the increase/decrease of body temperature in numerical-value-type data.

Characteristics of abnormal Hemodynamics data include: the increase/decrease of a rate of wave group of invasive arterial blood pressure, a high-pointed/low-flat shape, the increase/decrease of wave group of pulmonary artery pressure, and the numerical-value-type data of the increase/decrease of systolic pressure and diastolic pressure, the increase/decrease of mean arterial pressure, the increase/decrease of central venous pressure (CVP), the increase/decrease of right atrial pressure (RAP), the increase/decrease of pulmonary arterial pressure (PAP), the increase/decrease of pulmonary artery wedge pressure (PAWP), the decrease of cardiac output (CO), the increase/decrease of systemic circulation resistance (SVR), the increase of pulmonary circulation resistance (PVR), the decrease of cardiac index (CI), the decrease of stroke output (SV), the decrease of cardiac index (CI) of minimally invasive PICCO, the decrease of pulse continuous cardiac output (PCCO), the increase/decrease of heart rate (HR), the increase/decrease of ambulatory blood pressure (ABP), the decrease of stroke volume (SV), the decrease of cardiac function index (CFI), the increase of extravascular lung water (EVLW), the increase/decrease of central venous pressure (CVP), the increase/decrease of intrathoracic blood volume index (ITBI), the increase/decrease of peripheral vascular resistance (SVR), the increase of global end-diastolic volume index (GEDI), the increase of pulse pressure variability (PPV), and the increase of product of heart rate and systolic pressure (RPP).

Characteristics of abnormal blood gas analysis (ABG) data include: the increase/decrease of blood acid-base scale (PH), the increase/decrease of arterial partial pressure of carbon dioxide ($PaCO_2$), the decrease of arterial partial pressure of oxygen ($PaO_2$), the increase of lactic acid (Lac), the increase/decrease of standard bicarbonate ($HCO^{3-}$), the increase/decrease of base excess (BE), the increase/decrease of blood potassium ($K^+$), and the increase/decrease of blood calcium ($Ca^{2+}$).

Characteristics of abnormal intracranial pressure (ICP) data include: plateau wave (A wave) in the form of intracranial pressure wave group, which lasts for more than 5 minutes, and the increase of intracranial pressure (ICP), and the increase/decrease of cerebral perfusion pressure (CPP) in numerical-value-type data. Characteristics of abnormal electroencephalography (EEG) data include: brain wave group appearing in a straight line, or the decrease of bispectral index (BIS) of numerical-value-type data, and the increases/decrease of entropy index (Entropy).

Characteristics of abnormal data of urine output (UO) dynamic monitoring include: the decrease of urine flow/hour value and the decrease of total urine output. Characteristics of abnormal data of the infusion pump include: the increase of infusion pressure, and an infusion time being longer than a setting time. A characteristic of abnormal data of fetal heart monitoring includes: the increase/decrease of fetal heart rate.

Characteristics of abnormal data of respiratory mechanics include: flow rate, volume wave group being linear (asphyxia), the increase/decrease of inspiratory peak pressure, the increase/decrease of airway resistance, the increase/decrease of compliance, the increase/decrease of minute ventilation, the increase/decrease of spontaneous respiratory rate (RR), the increase of plateau pressure (Pplat), the increase/decrease of positive end-expiratory pressure (PEEP), the increase/decrease of inspired oxygen concentration, the increase of the number of invalid triggers, and human-machine asynchrony index being greater than 15%.

Characteristics of abnormal data of the intra-aortic balloon counterpulsation (IABP) include: the increase/decrease of a rate of electrocardiogram wave group, irregular rhythm, the increase/decrease of counterpulsation pressure, the increase/decrease of arterial blood pressure, and the decrease of balloon pressure.

Characteristics of abnormal data of continuous renal replacement therapy (CRRT) include: the increase/decrease of arterial pressure, the increase/decrease of venous pressure, the increase of transmembrane pressure, the increase/decrease of pre-filter pressure, the increase/decrease of filtration fraction (FF), the increase/decrease of temperature, the increase of heart rate and respiration rate, the decrease of arterial blood pressure, the decrease of arterial blood oxygen saturation ($PaO_2$), and the increase/decrease of central venous pressure (CVP) of devices.

Characteristics of abnormal data of extracorporeal membrane oxygenation (ECMO) system include: increase/decrease of centrifugal pump speed (rpm), flow (L/min), $FiO_2$ (inhaled oxygen concentration), gas flow (L/min), temperature (° C.) data deviation set value, and mean arterial pressure (MAP), decrease of mixed venous oxygen saturation ($SvO_2$), increase/decrease of activated whole blood coagulation time (ACT).

When identifying and finding abnormal data that exceeds a threshold, the central model marks an attribute of an abnormal event, and at the same time, the data analysis unit 1228 generates real-time data analysis reports for the abnormal data, and synchronously send, according to device IDs mapped by the patient's service serial numbers, the real-time data analysis reports and abnormal event warnings to a device that manages the user service terminal device 1240. It should be noted that the above threshold reference uses an internationally accepted clinical diagnosis criterion of medical data as the threshold reference for analysis and calculation.

Entire processes of data dynamic analysis reports generated by the data analysis unit 1228 in this embodiment includes: comprehensive analysis and calculation of the entire process of data of each type of device, waveform classification and numerical-value-type data labeling, event labeling, waveform graphics, and trend charts, histograms, scattergram, variability analysis chart thereof.

The generated real-time data analysis report includes: real-time analysis measurement calculation of each device, abnormal waveform and numerical-value-type data classification and labeling, and event annotation.

The cloud platform 1220 stores the above data analysis reports into the file database, and sends at the same time the reports to the user service terminal device 1240 for managing patients. The user may further send data invoking instructions to the cloud platform 1220 through the service terminal device 1240 for retrieval and query of the data analysis reports, statistical analysis, and review and summary.

In this embodiment, the service instruction of the service terminal device 1240 includes user information, permissions, instruction names, and parameters, and includes: real-time data service instructions, data invoking instructions, abnormal-data-event query instructions, data-analysis-report managing instructions, medical-document service instructions, data analysis and statistics instructions, user-defined item setting instructions, consultation initiating instructions, patient status evaluation instructions, device remote operation instructions, medical-collaboration information issuing instructions, and medical-tool-library query instructions, and the instructions may be embedded in the service terminal device 1240, or may be temporarily input. Various types of subunits of the third-party-business service unit 1229 in the cloud platform authenticate and analyze the instructions, and execute the service instructions according to the instruction parameters. The service terminal device 1340 is able to input the service instructions through built-in artificial intelligence large language models (LLMs), and convert voice into a service instruction according to a composition specification of the service instruction, and the LLMs may be one of LLaMA, ChatGPT, ChatGLM, StableLM, or MOSS.

Compared with some implementations, the cloud-edge collaborative processing system for ICU data based on third-party business provided by this embodiment decomposes and converts various onerous business tasks of the user's ICU medical staff, as well as operation procedures and content into service units running on the cloud platform. It is preset that the service instruction consisting of an instruction name and a parameter is used to control the start. In addition, procedures are set on the cloud platform to analyze the service instruction, and authenticate user information and permission, which ensures the security of the cloud platform and third-party-business services. The user can quickly send an instruction to the cloud platform through the service terminal device, to gain support from the third-party-business service. This effectively reduces the workload of the medical care personnel and improves the medical quality.

The third-party-business service unit 1229 includes user-defined item setting subunits. One of the user-defined item setting subunits receives and parses the user-defined item setting instructions, authenticates user information and validity statuses of permissions that are carried by the instructions, sends response messages with license information to the service terminal device 1240, and permits the user to edit, set and update user-defined items. The cloud platform 1220 executes new settings and updates the edge computing system 1200, records of the setting operation are stored into the business information database; and the user-defined items include: system file configurations, business rule configurations, third-party service item selection, message notification manners and scopes, and user-operation-interface settings.

Compared with some implementations, the cloud-edge collaborative processing system for ICU data based on third-party business provided in this embodiment provides a convenient tool of setting the user-defined terms to the user, supports the user to configure a system configuration, a rule configuration of business, a mode and scope of message notification, options of items of a third-party service, and a user operation interface according to requirements and habits of the user, which improves user experience and convenience, and stores a record of the operation of setting user-defined items, effectively guarantees the security of the cloud platform, the edge computing system and the business service.

The third-party-business service unit 1229 includes data service subunits, where one of the data service subunits receives and parses real-time data service instructions, authenticates user information and validity statuses of permissions that are carried by the instructions, and controls the data communication unit to receive the medical data sent by the edge computing system in real time 1200, and decrypt and store medical data in the caching database. The data analysis unit 1228 reads the medical data in the database in real time, performs real-time analysis and auxiliary review, stores the data into the clinical database, generates data analysis reports at the same time, and sends auxiliary-reviewed data and the data analysis reports to the service terminal device for real-time live broadcast, browsing and reading. Record of the real-time data service operation are stored into the business information database.

Compared with some implementations, in the cloud-edge collaborative processing system for ICU data based on third-party business provided in this embodiment, by authenticating the user information and the validity status of permission that are carried by the real-time data service instruction, invalid access is controlled, safe and reliable operation of the cloud platform is guaranteed, the problem that the ICU medical data is difficult to be analyzed and interpreted in real time and problem of lack of data analysis report are solved, the problem of lack of storage, management and reuse of ICU medical data in hospitals at all levels is solved, users are supported to improve a status of a clinical medical service, and medical quality and work efficiency are improved. The cloud platform stores records of real-time data service operations to ensure the security of business services.

The third-party-business service unit 1229 includes data invoking subunits, where one of the data invoking subunits receives and parses the data invoking instructions, authenticates user information and validity statuses of permissions that are carried by the instructions, sends response messages with license information to the service terminal device 1240, according to parameter information of the instructions, retrieves and invokes data that meets the instruction parameters, and provides the invoked data to the service terminal device 1240 for browsing and reading. Record of the data invoking operation are stored in the business information database. The data type includes: real-time data, historical data, and data analysis reports.

Compared with some implementations, the cloud-edge collaborative processing system for ICU data based on third-party business provided in this embodiment provides a convenient data invoking tool to the user, the user is supported to quickly acquire accurate and complete medical data information, know a variation of the illness of a patient, evaluate a medical effect, and prepare a medical decision-making solution, which improves the quality of medical care and the working efficiency. Moreover, the records of the data invoking operation are stored, which guarantees the data security of the cloud platform and the user.

The third-party-business service unit 1229 includes medical-document managing subunits, where one of the medical-document managing subunits receives and parses the data invoking instructions, authenticates user information and validity statuses of permissions that are carried by the instructions, sends response messages with license information to the service terminal device 1240, and according to parameter information of the instructions, retrieves and selects data that meets the instruction parameters. The service terminal device 1240 performs operations of creation, editing, inquiry, maintenance and storage through embedded voice, handwriting and spelling LLMs. Record of the management operation are stored in the business information database. Types of the medical document include: clinical orders, nursing forms, electronic medical records, statistics data sheets, clinical logs, and customized files; and the LLMs configured in the service terminal device 1240 may be one of the following common tools: LLaMA, ChatGPT, ChatGLM, StableLM, or MOSS.

Compared with some implementations, the cloud-edge collaborative processing system for ICU data based on third-party business provided in this embodiment provides a convenient tool of electronization of medical documents to the user, tedious handwriting transcription or keyboard entering of various medical documents of the user is converted into voice, handwriting, and spelling input of the service terminal device of the user, which reduces the operation complexity for medical care personnel, improves work efficiency, and application of artificial intelligence voice tools, and further improves the quality of medical documents. In addition, the records of medical document management operation are stored, which grantees the reliability, security, and traceability of medical documents.

The third-party-business service unit 1229 includes device remote operation service subunits, where one of the device remote operation service subunit receives and parses the device remote operation instructions, authenticates user information and validity statuses of permissions that are carried by the instructions, sends response messages with license information to the service terminal device 1240, and retrieves ID (or IDs) of a single or a plurality of diagnosis and treatment device according to service serial numbers mapped by a single or a plurality of pieces of patient information in the instruction parameter. The service terminal device 1240 connects, through the cloud platform-edge computing system, to ICU diagnosis and treatment device that meets the instruction parameters, remotely controls and adjusts a working mode of the device, performs status query, configuration modification, device maintenance, and data observation operations, and the obtained data is stored according to the data type. Record of the device remote operation are stored in the business information database.

Compared with some implementations, the cloud-edge collaborative processing system for ICU data based on third-party business provided in this embodiment provides a convenient tool of a device remote operation to the user, supports the user-service terminal device to remotely control the ICU diagnosis and treatment device, change/adjust the working mode of the device, and adjust a working status of the device in a timely manner, which meets the treatment need of a patient. In addition, the records of the device remote operation are stored, which grantees the security of the cloud platform and a clinical medical service of the user.

The third-party-business service unit 1229 includes consultation service subunits, where one of the consultation service subunits receives and parses the consultation initiating instructions, authenticates user information and validity statuses of permissions that are carried by the instructions, sends response messages with license information to the service terminal device 1240, according to patient information and information of a consultant in the instruction parameter, sends notices of starting multimedia consultation to the consultant through the cloud platform, establishes multimedia data links between the initiator and the consultant, maps service serial numbers according to the patient information, shares patient data, conducts bedside multimedia audio-visual and medical data consultation, and stores file data of the consultation in the file database. Record of the consultation service operation are stored into the business information database.

Compared with some implementations, the cloud-edge collaborative processing system for ICU data based on third-party business provided in this embodiment provides a convenient tool of consultation and communication for ICUs of small and medium-sized hospitals, quickly establishes a medical data and medical resource sharing platform between them and large-sized hospitals, to conduct consultation and on-site observation for high-risk intractable patients on the cloud platform, analyze medical data, and guide the small and medium-sized hospitals to make clinical medical decisions, which improves medical levels of ICUs of small and medium-sized hospitals and the utilization of medical resources.

The third-party-business service unit 1229 includes medical-collaboration information issuing subunits, where one of the medical-collaboration information issuing subunit receives and parses the medical-collaboration information issuing instructions, authenticates user information and validity statuses of permissions that are carried by the instructions, sends response messages with license information to the service terminal device 1240, according to patient information, illness levels, and information about medical collaboration team (or teams) in the instruction parameters, sends collaboration information to service terminal devices of the medical collaboration teams through the cloud platform 1220, and prompts with sound, light, vibration, graphics and text; the service terminal device of the medical collaboration team map service serial number (or numbers) according to the patient information, invokes medical data for reading and browsing, and quickly gives diagnosis and treatment opinion (or opinions); and Record of the medical-collaboration information issuing operation are stored into the business information database.

Compared with some implementations, the cloud-edge collaborative processing system for ICU data based on third-party business provided in this embodiment supports the user to use the cloud platform to establish a multidisciplinary medical cooperative emergency rapid response team (RRT), to centralize multidisciplinary medical resources to provide all-round medical services for high-risk intractable patients, and centralize multidisciplinary medical resources in the shortest time to provide all-round treatment when ICU patients are in a high-level emergency state. "One-click" startup and pre-reading of medical data, overcomes the disadvantage that ICU medical staff of the user relies on manual calling to centralize medical resources and improves the medical quality and work efficiency of the user.

The third-party-business service unit 1229 includes medical-tool-library service subunits, where one of the medical-tool-library service subunits receives and parses the tool-library query instructions, authenticates user information and validity statuses of permissions that are carried by the instructions, and sends response messages with license information to the service terminal device 1240. According to a query data type in the instruction parameter, the service terminal device 1240 connects to medical tool libraries for related information, to browse, read, operate and use. Records of the medical-tool-library query operation are stored in the business information database. The medical tool library includes ICU common drug management sub-libraries, clinical medical data sub-libraries and ICU device management sub-libraries.

Compared with some implementations, the cloud platform centrally manages tools and materials required for the daily work of ICUs and continuously updates them, and collects professional materials of clinical concern to provide services for medical staff related to the user. The medical staff can quickly get support and help through service terminal devices and various application tools configured in the devices, which can improve the work efficiency and save time.

Compared with some implementations, the cloud-edge collaborative processing system for ICU data based on third-party business provided by this embodiment decomposes various tedious business work and processes, including data analysis work, in the user's ICU into a plurality of standardized third-party-business service subunits, and sets service instructions consisting of user information, permission, instruction name and parameter. The service terminal device of the user sends the service instruction to the cloud platform, selects business service content, and obtains the third-party-business service. The third-party-business terminal of the cloud platform visually manages the process and state of the business service, ensures the quality of third-party service, greatly reduces the labor intensity of medical staff, improves the work efficiency and medical quality of the user, authenticates user identity and permission, prevents and controls invalid access or unauthorized use, and ensures the secure and reliable operation of the third-party-business service, which has wide applicability.

By using a data-analysis-report managing service of the cloud platform, the user can, by using the terminal device, quickly and conveniently retrieve and use the data analysis reports, to assist clinical medical decision-making, and evaluate a medical effect. With a data analyzing and counting service, the cloud platform provides the user with a universal medical statistical tool for analysis and counting of various business data, data mining, and clinical research. Through patient-status-assessment services of the cloud platform, the user is provided with general critical illness assessment system models (APACHE, SOFA, or MODS), patients' medical data and related indicators are automatically collected in the database, and patients' disease status and development trend are evaluated and predicted. The present application solves the clinical application problem of massive multi-source heterogeneous medical data in ICU, and can improve the medical quality in ICU and reduce the work pressure of medical staff.

Figure 14:
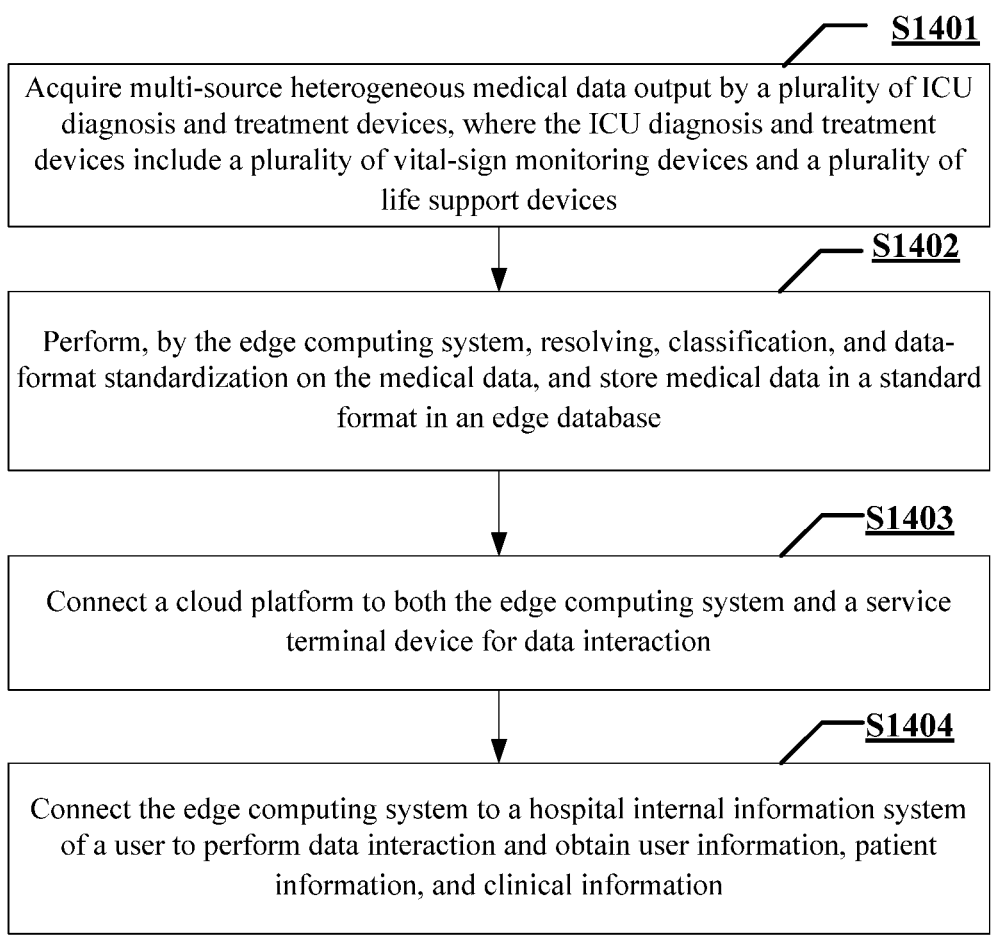
FIG. 14 is a flowchart of a cloud-edge collaborative processing method for ICU data based on third-party business according to a fourth embodiment of the present application.

Refer to FIG. 14, a fourth embodiment of the present application discloses a cloud-edge collaborative processing method for ICU data based on third-party business, including the following steps S1401 to S1404.

Step S1401: Acquire multi-source heterogeneous medical data output by an ICU diagnosis and treatment device, where the ICU diagnosis and treatment device includes a plurality of vital-sign monitoring devices and a plurality of life support devices.

S1402: Perform, by the edge computing system, preprocessing of resolving, classification, and data-format standardization (a device-initial-alarming-event sign is reserved) on the multi-source heterogeneous medical data, and store medical data in a standard format in an edge database.

Specifically, ID code (or codes) of ICU diagnosis and treatment device (or devices) and patient information are bound to generate service serial number (or numbers); the device-initial-alarming-event sign (or signs) is reserved when generating the medical data in the standard format through preprocessing; and the service serial number (or numbers) and the preprocessed medical data are integrally encapsulated, and encapsulated data is stored into the edge database, where one of the service serial number includes a timestamp, the user information, the patient information, the clinical information, device information, and a quantity counter.

S1403: Connect a cloud platform to both the edge computing system and a service terminal device for data interaction, where the data includes service instructions and medical data, and the service terminal device includes a plurality of medical-staff handheld terminals and a plurality of ward data terminals.

Specifically, medical data sent by the edge computing system and a service instruction sent by the service terminal device are received in real time, the medical data is decrypted and the decrypted medical data is stored into a caching database, and a user is provided with a third-party-business services according to the service instructions and parameters carried by the service instructions. Data in the caching database is read in real time for analysis and calculation and auxiliary analysis and review, the data is stored into a clinical database, data analysis reports is generated, and the reviewed data and the data analysis reports are sent to the service terminal device for real-time live broadcast, browsing, and reading. The edge computing system receives data and control instructions returned by the cloud platform, and performs various business tasks, including updating programs, file configurations, and data in the edge database.

Step S1404: Connect the edge computing system to hospital internal information systems of users to perform data interaction and obtain user information, patient information, and clinical information. In addition, required medical data is provided to the hospital internal information systems of users through the edge computing system.

The method includes: monitoring a network running status through a security management unit in the edge computing system, discovering network failure event (or events), triggering a system management unit to call function computing, controlling the edge computing system to directly connect to the service terminal device, reading the data in the edge database in real time to perform analysis and calculation, performing a live broadcast for visual display on the service terminal device to maintain continuous running of various business tasks, and when the network of cloud platform-edge computing system resumes data communication, encrypting data during the network failure and transmitting encrypted data to the cloud platform to restore a cloud-platform-business service function.

A cloud platform includes a cloud-platform data communication subsystem, a cloud-platform data support subsystem and a cloud-platform third-party-business subsystem.

The method further includes: reading the medical data in the caching database in real time through a data analysis unit of the cloud-platform data support subsystem, screening and identifying abnormal data in real time, finding abnormal data, and marking an attribute of an event;

synchronously performing, by a third-party-business terminal of the cloud-platform third-party-business subsystem, real-time auxiliary analysis and review on measured and calculated values, marks, attributes and signs of abnormal events, statistical values of data, graphs and waveforms of data, where reviewed medical data including qualitative and quantitative data is stored into the clinical database; visually managing processes and statuses of the third-party-business service through the third-party-business terminal;

generating, by the data analysis unit, real-time data analysis reports based on features of the abnormal data, abnormal events, and durations, storing the reports into a file database, sending the reports to the service terminal device at the same time, and sending abnormal-event warnings to the user;

integrating, by the data analysis unit, each patient's entire medical data, generating dynamic data analysis reports, storing the reports into the file database, and sending the reports to the service terminal device at the same time;

using, by the data analysis unit, the qualitative and quantitative medical data to train and optimize each type of central model to obtain various types of optimized central models;

synchronously encrypting, by the cloud platform, data after auxiliary analysis and review, and sending encrypted data to the edge computing system; and updating, by the edge computing system, the edge database data according to the service serial numbers.

The above method embodiment and system embodiment are based on the same or similar principles, and may refer to each other for the similar part, to achieve same effects.

A person skilled in the art can understand that all or part of the process of implementing the method of the above embodiment may be implemented by related hardware according to an instruction from a computer program, and the program may be stored in a computer-readable storage medium, where the computer-readable storage medium is a magnetic disk, an optical disc, a read-only memory, a random access memory, or the like.

The foregoing descriptions are merely preferred specific implementations of the present application, and the protection scope of the present application is not limited thereto. Any variation or replacement readily figured out by a person skilled in the art within the technical scope disclosed in the present application shall fall within the protection scope of the present application.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. A cloud-edge collaborative processing system for intensive care unit (ICU) data based on third-party business, comprising: an edge computing system, an ICU diagnosis and treatment device, a service terminal device, and a cloud platform, wherein the ICU diagnosis and treatment device comprises a plurality of vital-sign monitoring devices and a plurality of life support devices, and is connected to the edge computing system;

the edge computing system is configured to acquire multi-source heterogeneous medical data output from the ICU diagnosis and treatment device, preprocess the medical data through resolving, classification, and data-format standardization to generate medical data in a standard format, and store the medical data in an edge database;

the edge computing system is connected to hospital internal information systems of users to perform data interaction and obtain user information, patient information, and clinical information;

the service terminal device comprises a plurality of medical-staff handheld terminals and a plurality of ward data terminals, and is connected to the cloud platform to perform data interaction; and the cloud platform is connected to the edge computing system and performs data interaction;

wherein the edge computing system comprises an edge server, and the edge server comprises a system management unit, a data preprocessing unit, a security management unit, and the edge database, wherein the system management unit is configured to manage the ICU diagnosis and treatment device accessed by the edge computing system and a running status of the edge computing system; report to the cloud platform; receive data and control instructions from the cloud platform; execute various business tasks comprising updating a program, a configuration file, and data in the edge database; maintain business collaboration between the cloud platform and the edge computing system; manage the accessed hospital internal information systems; take over operation of a data service in the event of a network outage of the cloud platform-edge computing system, and after data communication of the network is restored, encrypt medical data during the failure event and upload encrypted data to the cloud platform for further processing;

the data preprocessing unit is configured to reserve device-initial-alarming-event signs when generating the medical data in the standard format through preprocessing; bind ID codes of ICU diagnosis and treatment devices therein and patient information to generate service serial numbers; encapsulate integrally one of the service serial numbers and the preprocessed medical data and store encapsulated data into the edge database; synchronously encrypt and transmit the encapsulated data to the cloud platform, wherein one of the service serial numbers comprises a timestamp, the user information, the patient information, the clinical information, device information, and a quantity counter;

the security management unit is configured to authenticate identities of a device and an external system, permit access to the edge computing system, monitor a running status of the device and network in real time, timely issue a security warning, desensitize privacy information in the medical data, trigger the system management unit to call function calculation when the network of the cloud platform-edge computing system fails, and maintain continuous running of the data service; and the edge database is configured to store various data of the edge computing system.

2. The cloud-edge collaborative processing system for ICU data based on third-party business according to claim 1, wherein the system management unit controls the edge computing system to directly connected to the service terminal device when the network failure of the cloud platform-edge computing system triggers callings of function calculation, to establish another data path; reads the medical data in the edge database to perform analysis and processing; performs a live broadcast on the service terminal device for visual display; and maintains continuous running of the data service.

3. The cloud-edge collaborative processing system for ICU data based on third-party business according to claim 1, wherein the data preprocessing unit is embedded with a plurality of communication protocols comprising: a TCP/IP protocol, an instant messaging protocol, an HL7 protocol, a DICOM protocol, a multi-media communication protocol, and an equipment manufacturer communication protocol, wherein the plurality of communication protocols are used to adapt to data communication interfaces of ICU diagnosis and treatment devices from different manufacturers and the hospital internal information systems.

4. The cloud-edge collaborative processing system for ICU data based on third-party business according to claim 1, wherein the vital-sign monitoring device comprises: multi-parameter monitors, hemodynamic monitors, blood gas analyzers, intracranial pressure monitors, electroencephalography monitors, urodynamic monitors, and fetal heart monitors; and the life support device comprises: ventilators, continuous renal replacement therapies (CRRT), infusion pumps, intra-aortic balloon pumps (IABP), and extracorporeal membrane oxygenation systems (ECMO).

5. The cloud-edge collaborative processing system for ICU data based on third-party business according to claim 1, wherein the cloud platform comprises: a cloud-platform data communication subsystem, a cloud-platform data support subsystem, and a cloud-platform third-party-business subsystem, wherein the cloud-platform data communication subsystem is configured to perform data communication and business interaction between the cloud platform and the edge computing system, and between the cloud platform and the service terminal device;

the cloud-platform data support subsystem is configured to, by applying a deep learning framework for distributed parallel computing, analyze and calculate the medical data received by the cloud platform in real time, generate data analysis reports, and store data and files in the cloud platform; and the cloud-platform third-party-business subsystem is configured to provide third-party-business services according to service instructions of the service terminal device, and perform auxiliary analysis and review on data processed in real time by the cloud-platform data support subsystem.

6. The cloud-edge collaborative processing system for ICU data based on third-party business according to claim 5, wherein the data comprises: service instructions, and medical data;

the cloud-platform data communication subsystem comprises: data communication units, wherein the data communication units are configured to receive the medical data sent by the edge computing system in real time and service instructions sent by the service terminal device, decrypt and store medical data in the caching database, transfer the service instructions to the cloud-platform third-party-business subsystem, and select business service tasks; and the data communication unit further performs interaction of encrypted data with the edge computing system and the service terminal device;

the cloud-platform third-party-business subsystem comprises: a third-party-business service unit and a third-party-business terminal, wherein the third-party-business service unit is configured to receive service instructions and provide third-party-business services to users, and the third-party-business terminal is connected to the cloud platform, is configured for auxiliary analysis and review of the medical data, and visual management of processes and statuses of various business services; and the cloud-platform data support subsystem comprises: a message bus unit, a data storage unit, a business arrangement unit, and a data analysis unit, wherein the message bus unit is configured to connect and control data transmission between subsystems and units in the cloud platform; the data storage unit comprises a clinical database, a file database, a business information database, and a caching database for storage and calling of data and files; the business arrangement unit is configured for unified management of the edge computing system accessing the cloud platform to perform business arrangement and scheduling; the data analysis unit is configured to read data in the caching database in real time and perform real-time analysis and processing, synchronously schedule the data to the third-party-business terminal for auxiliary analysis and review, store the data into the clinical database, and encrypt the data and transmit encrypted data to the edge computing system; and the edge computing system decrypts the encrypted data, and updates the data in the edge database according to the service serial numbers.

7. The cloud-edge collaborative processing system for ICU data based on third-party business according to claim 6, wherein the data analysis unit performs real-time analysis and screening on the medical data by using the deep learning framework based on distributed parallel computing;

the data analysis unit, based on the deep learning framework for distributed parallel computing, reads the medical data in the caching database in real time, performs calculation and measurement, labeling, feature extracting, and multi-dimension vectorization processing, creates a plurality of tasks in parallel by the deep learning framework for distributed parallel computing, controls a central model function of a corresponding type to identify data of the corresponding type, and marks attributes of the abnormal data when identification results exceeds setting thresholds;

the third-party-business terminal synchronously performs real-time auxiliary analysis and review on measured and calculated values, marks, attributes and signs of abnormal data, statistical values of data, graphs and waveforms of data streams, wherein reviewed medical data comprising qualitative and quantitative data is stored into the clinical database for generating data analysis reports;

the data analysis unit generates real-time data analysis reports based on features of the abnormal data, and attributes and durations of abnormal events, stores the reports into the file database, sends the reports to the service terminal device at the same time, and sends abnormal-event warnings to the users;

the data analysis unit integrates each patient's entire medical data, generates dynamic data analysis reports, stores the reports into the file database, and sends the reports to the service terminal device at the same time; and the data analysis unit uses the qualitative and quantitative medical data to train and optimize each type of central model to obtain optimized central models of various data types, and the deep learning framework for distributed parallel computing may be one of Spark, Samza, Storm, or Flink.

8. The cloud-edge collaborative processing system for ICU data based on third-party business according to claim 6, wherein one of the service instructions of the service terminal device comprises user information, permissions, instruction names, and specific parameters, and comprises: real-time data service instructions, data invoking instructions, abnormal-data-event query instructions, data-analysis-report managing instructions, medical-document service instructions, data analysis and statistics instructions, user-defined item setting instructions, consultation initiating instructions, patient status evaluation instructions, device remote operation instructions, medical-collaboration information issuing instructions, and medical-tool-library query instructions, and the instructions may be embedded in the service terminal device, or may be temporarily inputted; various types of third-party-business service subunits in the cloud platform authenticate and analyze the instructions, and execute the service instructions according to the instruction parameters; and the service terminal device is able to input the service instructions through built-in artificial intelligence large language models (LLMs), and convert voice into service instructions according to a composition specification of the service instruction, and the LLMs may be one of LLaMA, ChatGPT, ChatGLM, StableLM, or MOSS.

9. The cloud-edge collaborative processing system for ICU data based on third-party business according to claim 8, wherein the third-party-business service unit comprises user-defined item setting subunits; one of the user-defined item setting subunits receives and parses the user-defined item setting instructions, authenticates user information and validity statuses of permissions that are carried by the instructions, sends response messages with license information to the service terminal device, and permits the user to edit, set and update user-defined items; the cloud platform executes new settings and updates the edge computing system, records of the setting operation are stored into the business information database; and the user-defined items comprise: system file configurations, business rule configurations, third-party service item selections, message notification manners and scopes, and user-operation-interface settings.

10. The cloud-edge collaborative processing system for ICU data based on third-party business according to claim 8, wherein the third-party-business service unit comprises data service subunits, wherein one of the data service subunits receives and parses real-time data service instructions, authenticates user information and validity statuses of permissions that are carried by the instructions, and controls the data communication unit to receive the medical data sent by the edge computing system in real time, and decrypt and store the medical data into the caching database; the data analysis unit reads the medical data in the caching database in real time, performs real-time analysis and auxiliary review, stores the data into the clinical database, generates data analysis reports at the same time, and sends auxiliary-reviewed data and data analysis reports to the service terminal device for real-time live broadcast, browsing and reading; and records of the real-time data service operation are stored into the business information database.

11. The cloud-edge collaborative processing system for ICU data based on third-party business according to claim 8, wherein the third-party-business service unit comprises data invoking subunits, wherein one of the data invoking subunit receives and parses the data invoking instruction, authenticates user information and validity status of permissions that are carried by the instructions, according to parameter information of the instructions, retrieves and invokes data that meets the instruction parameters, and provides the invoked data to the service terminal device for browsing and reading; records of the data invoking operation are stored in the business information database; and the data type comprises: real-time data, historical data, and data analysis reports.

12. The cloud-edge collaborative processing system for ICU data based on third-party business according to claim 8, wherein the third-party-business service unit comprises medical-document managing subunits, wherein one of the medical-document managing subunit receives and parses the medical-document service instructions, authenticates user information and validity statuses of permissions that are carried by the instructions, and according to parameter information of the instructions, retrieves and selects medical documents that meets the instruction parameters; the service terminal device performs operations of creation, editing, inquiry, maintenance and storage through embedded voice, handwriting and spelling LLMs, and records of the management operation are stored in the business information database; types of the medical documents comprise: clinical orders, nursing forms, electronic medical records, statistics data sheets, clinical logs, and customized files; and the LLMs configured in the service terminal device may be one of the following common tools: LLAMA, ChatGPT, ChatGLM, StableLM, or MOSS.

13. The cloud-edge collaborative processing system for ICU data based on third-party business according to claim 8, wherein the third-party-business service unit comprises device remote operation service subunits, wherein one of the device remote operation service subunits receives and parses the device remote operation instructions, authenticates user information and validity statuses of permissions that are carried by the instructions, and retrieves a single or a plurality of diagnosis and treatment device IDs according to service serial numbers mapped by a single or a plurality of pieces of patient information in the instruction parameters; the service terminal device connects, through the cloud platform-edge computing system, to an ICU diagnosis and treatment device that meets the instruction parameters, remotely controls and adjusts the working mode of the device, performs status query, configuration modification, device maintenance, and data observation operations, and the obtained data is stored according to the data type; and records of the device remote operation are stored in the business information database.

14. The cloud-edge collaborative processing system for ICU data based on third-party business according to claim 8, wherein the third-party-business service unit comprises a consultation service subunits, wherein one of the consultation service subunits receives and parses the consultation initiating instructions, authenticates user information and validity statuses of permissions that are carried by the instructions, according to patient information and information of a consultant in the instruction parameters, sends notices of starting multimedia consultation to the consultant through the cloud platform, establishes multimedia data links between the initiator and the consultant, maps service serial numbers according to the patient information, shares patient data, conducts bedside multimedia audio-visual and medical data consultation, and stores file data of the consultation in the file database; and records of the consultation initiating operation are stored into the business information database.

15. The cloud-edge collaborative processing system for ICU data based on third-party business according to claim 8, wherein the third-party-business service unit comprises medical-collaboration information issuing subunits, wherein one of the medical-collaboration information issuing subunits receives and parses the medical-collaboration information issuing instructions, authenticates user information and validity statuses of permissions that are carried by the instructions, according to patient information, illness levels, and information about medical collaboration teams in the instruction parameters, sends collaboration information to service terminal devices of the medical collaboration teams through the cloud platform, and prompts with sound, light, vibration, graphics and text; the service terminal devices of the medical collaboration teams map service serial numbers according to the patient information, invokes medical data for reading and browsing, and quickly gives a diagnosis and treatment opinion; and records of the medical-collaboration information issuing operation are stored into the business information database.

16. The cloud-edge collaborative processing system for ICU data based on third-party business according to claim 8, wherein the third-party-business service unit comprises medical-tool-library service subunits, wherein one of the medical-tool-library service subunits receives and parses the tool-library query instructions, authenticates user information and validity statuses of permissions that are carried by the instructions, and according to query data types in the instruction parameters, permits the service terminal device to connect to medical tool libraries, to browse, read, operate and use; records of the medical-tool-library query operation are stored in the business information database; and one of the medical tool libraries comprises ICU common drug management sub-libraries, clinical medical data sub-libraries and ICU device management sub-libraries.

17. A cloud-edge collaborative processing method for ICU data based on third-party business, comprising:
acquiring multi-source heterogeneous medical data outputted by an ICU diagnosis and treatment device, wherein the ICU diagnosis and treatment device comprises a plurality of vital-sign monitoring devices and a plurality of life support devices;
performing, by an edge computing system, resolving, classification, and data-format standardization on the medical data, and storing the medical data in a standard format in an edge database;
respectively connecting a cloud platform to the edge computing system and a service terminal device for data interaction, wherein the data comprises service instructions and medical data, and the service terminal device comprises a plurality of medical-staff handheld terminals and a plurality of ward data terminals; and
connecting the edge computing system to hospital internal information systems of users to perform data interaction and obtain user information, patient information, and clinical information;
wherein the performing, by the edge computing system, resolving, classification, and data-format standardization on the medical data, and storing medical data in a standard format in an edge database further comprises:
receiving, by the edge computing system, the multi-source heterogeneous medical data, and binding ID codes of ICU diagnosis and treatment devices and patient information to generate service serial numbers;
reserving device-initial-alarming-event signs when generating the medical data in the standard format through preprocessing; and
encapsulating integrally one of the service serial numbers and the preprocessed medical data, and storing encapsulated data into the edge database, wherein one of the service serial number comprises a timestamp, the user information, the patient information, the clinical information, device information, and a quantity counter; and
respectively connecting the cloud platform to the edge computing system and service terminal device for data interaction further comprises:
receiving medical data sent by the edge computing system in real time, and service instructions sent by the service terminal device, decrypting and storing the medical data into a caching database, and providing users with a third-party-business services according to the service instructions and parameters carried in the service instructions;
reading data in the caching database in real time for analysis, calculation and auxiliary review, storing the data into a clinical database, generating data analysis reports, and sending the reviewed data and the data analysis reports to the service terminal device for real-time live broadcast, browsing, and reading;
receiving, by the edge computing system, data and control instructions sent by the cloud platform, and performing various business tasks, comprising updating programs, file configurations, and data in the edge database;
providing required medical data to the hospital internal information systems of users through the edge computing system; and
monitoring network running statuses through a security management unit in the edge computing system, discovering network failure events, triggering system management unit to call function computing, controlling the edge computing system to directly connect to the service terminal device, reading the data in the edge database in real time to perform analysis and calculation, performing a live broadcast for visual display on the service terminal device to maintain continuous running of various business tasks, and when the network of cloud platform-edge computing system resumes data communication, encrypting data during the network failure and transmitting encrypted data to the cloud platform to restore cloud-platform-business service functions.

18. The cloud-edge collaborative processing method for ICU data based on third-party business according to claim 17, wherein the cloud platform comprises a cloud-platform data communication subsystem, a cloud-platform data support subsystem, and a cloud-platform third-party-business subsystem, and the method comprises:
reading the medical data in the caching database in real time through a data analysis unit of the cloud-platform data support subsystem, screening and identifying abnormal data in real time, finding abnormal data, and marking attributes of events;
synchronously performing, by a third-party-business terminal of the cloud-platform third-party-business subsystem, real-time auxiliary analysis and review on measured and calculated values, marks, attributes and signs of abnormal events, statistical values of data, graphs and waveforms of data, wherein reviewed medical data comprising qualitative and quantitative data is stored into the clinical database;
visually managing the processes and statuses of the third-party-business service through the third-party-business terminal;
generating, by the data analysis unit, real-time data analysis reports based on features of the abnormal data, abnormal events, and durations, storing the reports into a file database, sending the reports to the service terminal device at the same time, and sending abnormal-event warnings to the users;
integrating, by the data analysis unit, each patient's entire medical data, generating dynamic data analysis reports, storing the reports into the file database, and sending the reports to the service terminal device at the same time;
using, by the data analysis unit, the qualitative and quantitative medical data to train and optimize each type of central models to obtain optimized central models of various types, and
synchronously encrypting and sending data after auxiliary analysis and review by the cloud platform to the edge computing system.

* * * * *